United States Patent [19]

Scholz

[11] 3,970,377
[45] July 20, 1976

[54] SOUND MOTION PICTURE PROCESSING AND PROJECTION SYSTEM

[75] Inventor: Donald T. Scholz, Watertown, Mass.

[73] Assignee: Polaroid Corporation, Cambridge, Mass.

[22] Filed: Dec. 12, 1974

[21] Appl. No.: 531,871

Related U.S. Application Data

[62] Division of Ser. No. 374,639, June 28, 1973, Pat. No. 3,893,756.

[52] U.S. Cl. .................................. 352/14; 352/72
[51] Int. Cl.² ........................................ G03B 31/02
[58] Field of Search .................... 352/14, 29, 72, 78, 352/130, 159

[56] References Cited
UNITED STATES PATENTS

| | | | |
|---|---|---|---|
| 3,244,469 | 4/1966 | Hennessey et al. | 352/14 |
| 3,442,580 | 5/1969 | Winkler | 352/72 |
| 3,597,056 | 8/1971 | Sasaki | 352/14 |
| 3,825,327 | 7/1974 | Kosarko et al. | 352/14 X |

Primary Examiner—L. T. Hix
Assistant Examiner—Alan Mathews
Attorney, Agent, or Firm—John W. Ericson

[57] ABSTRACT

A sound motion picture production and sound editing system comprising a film cassette containing a strip of photosensitive film having a sound track thereon, a supply of processing composition and a processor programmed to apply the processing composition to the film upon manipulation of the film in the cassette; a film drive projection and sound reproducing system adapted to receive the cassette, and containing cyclic drive means responsive to the insertion of a cassette and to a signal produced by the cassette indicating whether or not the film has been processed for manipulating the film, to cause processing if the film has not been processed, and then to project it while reproducing sound recorded on the film; or simply to project the film, while reproducing the sound recorded on it, if it has been processed, in which a sound array comprising a recording and reproducing transducer and a film drive capstan are engaged with the film during projection, to permit recording on, or playback from the sound track.

9 Claims, 19 Drawing Figures

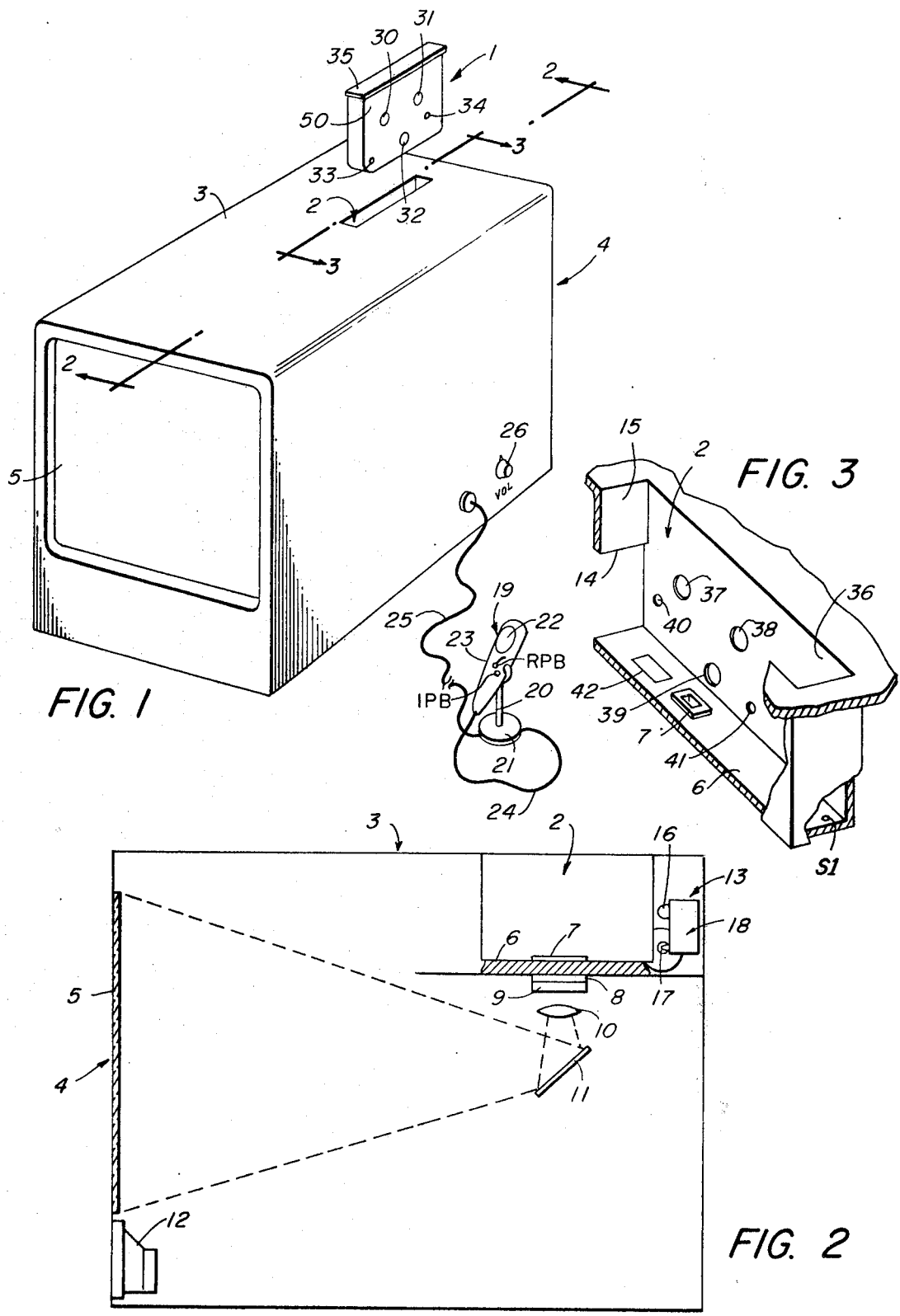

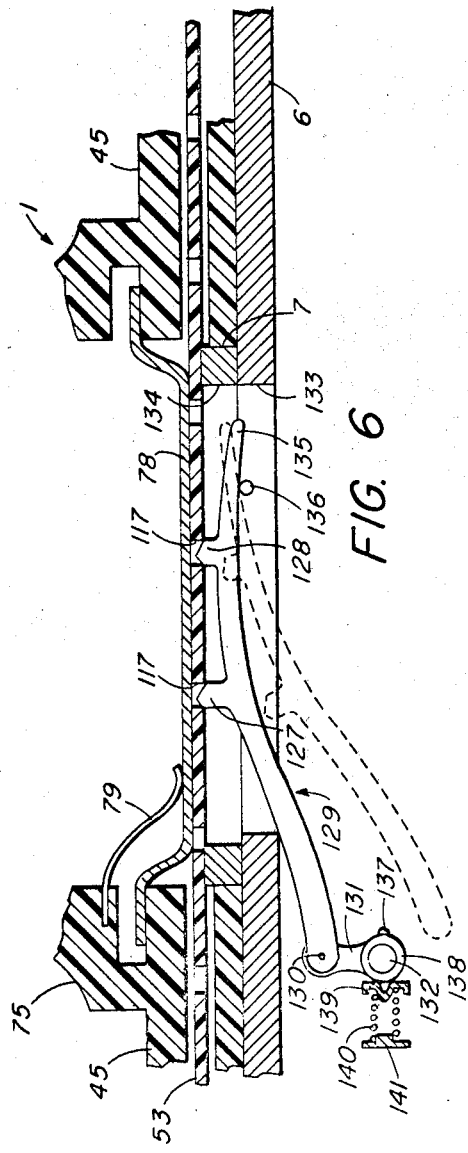
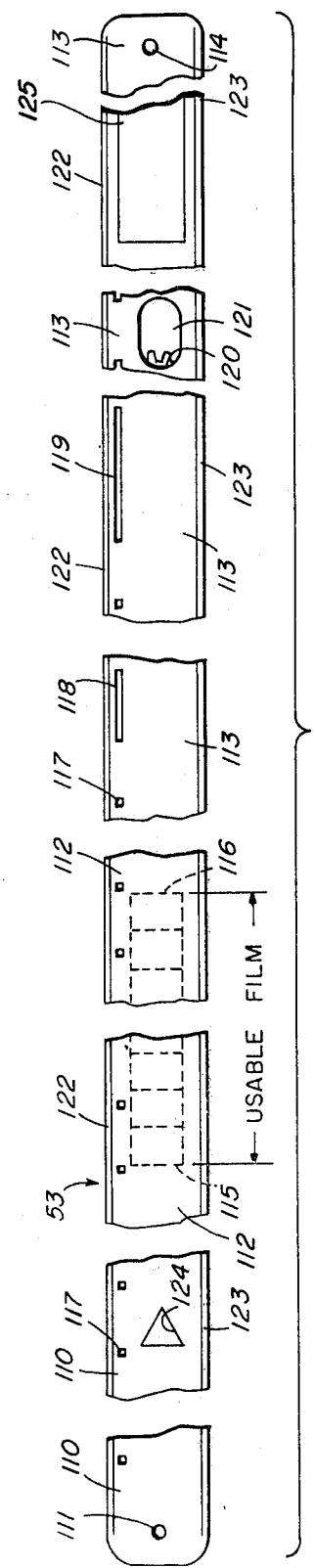
FIG. 6
FIG. 5

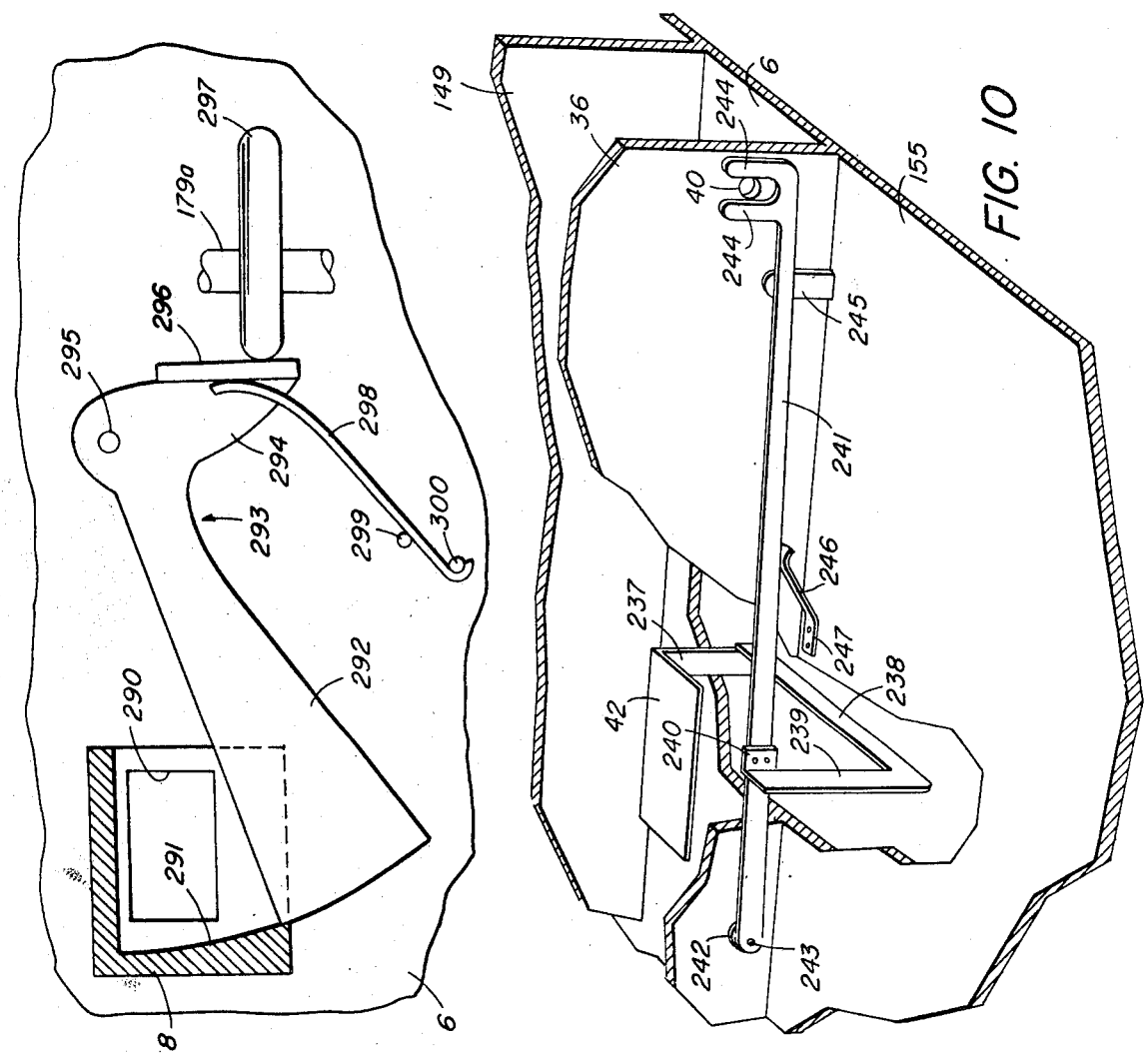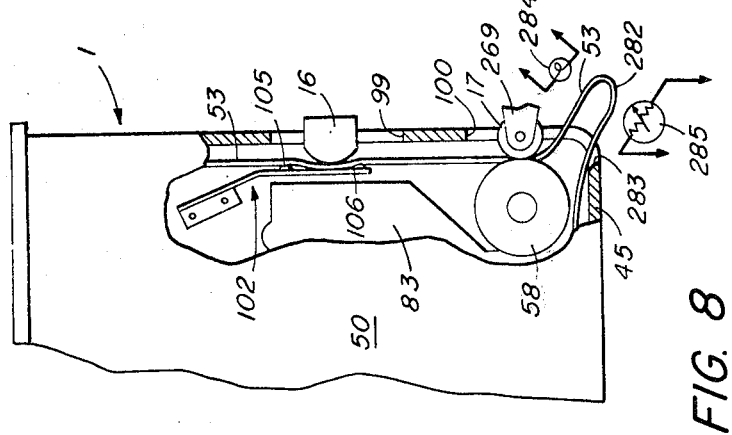

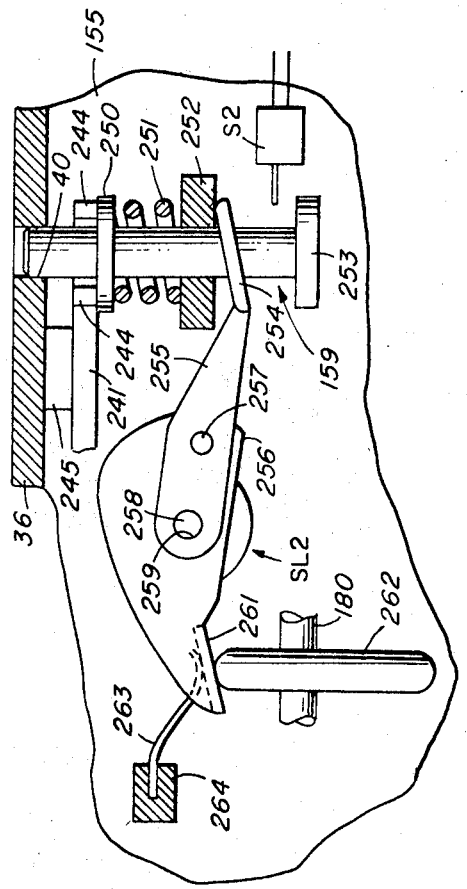
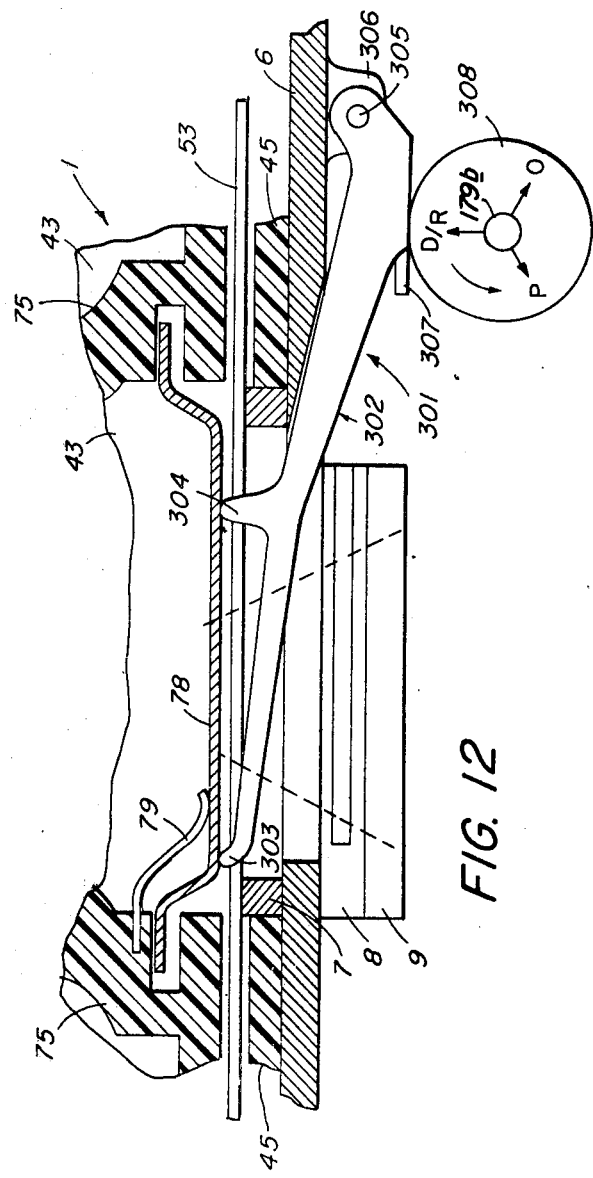
FIG. 11
FIG. 12

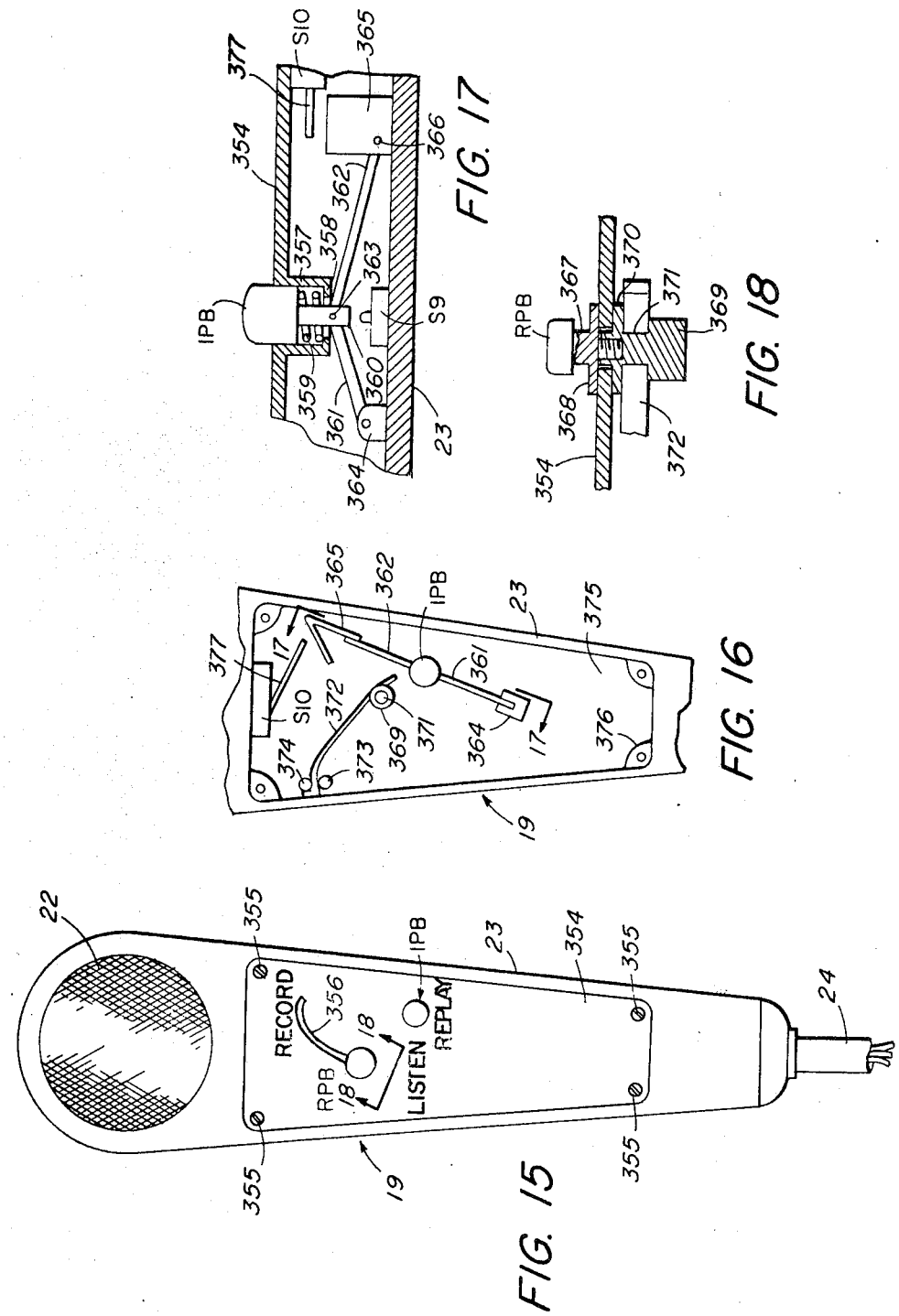

SOUND MOTION PICTURE PROCESSING AND PROJECTION SYSTEM

This is a division of application Ser. No. 374,639, filed June 28, 1973, now U.S. Pat. No. 3,893,756.

This invention relates to sound cinematography, and particularly to a novel system for processing, producing and editing sound motion pictures.

A photographic system for processing and projecting motion pictures is disclosed in U.S. application Ser. No. 227,080, filed on Feb. 17, 1972, now abandoned, by Edwin H. Land for Photographic System for Processing and Projecting Transparencies, and assigned to the assignee of this application. The primary object of this invention is to extend the capabilities of that system to permit the recording, reproduction and editing of a sound track on the film whereby a sound motion picture can be produced.

The system disclosed in the above-cited application Ser. No. 227,080 comprises, as the key element, a replaceable film cassette. The cassette contains a strip of film, a supply of processing composition for the film, and an internally programmed processor responsive to manipulation of the film in the cassette for applying the processing composition to the film after its exposure. The cassette is adapted to be inserted in a camera, for exposure of the film. After exposure, it is inserted into a film drive and projection system. This system comprises a receptacle shaped to receive the cassette, and cyclic drive apparatus for manipulating the film in the cassette. The film is manipulated in a sequence determined by a signal provided by the cassette that indicates whether or not the film has been processed.

In response to the insertion of a cassette containing unprocessed film, the film drive and projection apparatus manipulates the film in the cassette in a lighttight environment. That movement of the film activates the processor, developing the film to produce a series of fixed, visible, projectible images. Thereafter, the apparatus manipulates the film in an optical system, causing it to be projected for viewing. The film is then rewound, for storage and subsequent reuse. Finally, the cassette is ejected. In response to the insertion of a cassette containing processed film, the system simply projects the film, rewinds it, and then ejects the cassette.

There are a number of problems inherent in adding sound capabilities to a motion picture system of the type described in the above-cited application Ser. No. 227,080. One of these is that the apparatus is designed to handle the cassette and the film in it as a unit, without requiring a length of film to be taken out of the cassette and threaded through a projection system. In order to insure good sound quality without wow and flutter, it is necessary to move the recording medium smoothly relative to the sound transducer at a constant speed. On the other hand, conventional projection apparatus involves incremental motion of the film at the film gate for projection purposes, the film being stopped as each frame is projected and then rapidly advanced to the next frame. In order to accomodate these different motions, a film loop is conventionally provided between the sound station and the projection station to allow the film to have different speeds at different locations while maintaining the same overall average speed. Establishing the necessary drive connections to the film for this purpose is preferably accomplished automatically, but should not be allowed to interfere with the processing of the film before it is projected. Also, it would be desirable to remove a loop, formed for the purposes of film transport during sound recording or reproduction and projection, before the cassette is removed from the apparatus. The particular objects of my invention are to facilitate the engagement of a sound drive capstan and film advance pawl with the film in a cassette of the self-processing type, without interfering with the self-processing function, and to facilitate disengagement of the sound and film advance pawl, when appropriate, while automatically removing the motion isolating loop in the film so that the cassette can be ejected from the apparatus with the film fully enclosed in it.

Briefly, the above and other objects of the invention are attained by the construction of a novel sound motion picture production and editing system which comprises a console provided with a viewing screen, a loudspeaker, and a receptacle shaped to receive a cassette containing film and a processing unit for the film. On the film is recorded a sound track, preferably of magnetic material, and most preferably along one edge of the film on a raised rail of greater thickness than the region of the film on which the optical images are recorded.

When a cassette is received in the console, sensing means in the console determine whether or not the film has been processed, and proceeds accordingly in one of two predetermined cycles. If the film is unprocessed, in that it has been exposed to produce latent optical images but not yet developed, it is carried through a processing cycle in which a container of processing composition inside the processing unit is opened and the composition is coated on the film. The film is then projected, rewound and ejected. If the cassette initially contains processed film, the cycle consists in projecting and rewinding the film.

During the projection cycle, whether the film has just been processed, or has previously been processed, sound that has been recorded on the sound track on the film is reproduced, by means of a sound array comprising a film drive capstan and sound transducer. The sound array is engaged with the film simultaneously with the engagement of a snubber stop that cooperates with a film drive pawl to advance the film incrementally past the film gate.

In order to avoid the howl normally produced when a film drive capstan is started up in a sound reproducing system, the capstan drive motor is kept running constantly at a speed near the speed at which it will drive the film. Thus, the capstan is already essentially at drive speed when it engages the film so that the apparatus begins quickly to reach recording speed.

By means of control apparatus to be described below, the capstan drive speed is initially made faster than the drive provided for the film drive pawl at the film gate so that a loop of film isolating the sound station from the projection station is quickly established. This loop is maintained in a relatively fixed average size by a servomechanism to be described, so long as the apparatus is in the projection cycle.

At the end of the projection cycle, the sound array is withdrawn, and the incremental drive is interrupted. The film is then rewound, whereupon the film loop formed as described above is immediately pulled out. During projection and reproduction of the sound, the operator can interrupt to edit the sound by adding new sound recording, simultaneously erasing the old, and can also return the film for a fixed minimum length, or for any desired length, so that portions of the film may be replayed for reviewing and sound editing purposes.

The manner in which the apparatus of the invention is constructed, and its mode of operation, will best be understood in the light of the following detailed description, together with the accompanying drawings, of an exemplary embodiment thereof.

In the drawings,

FIG. 1 is a schematic perspective sketch of an audiovisual system comprising a replaceable film cassette and a sound motion picture producing and sound editing system in accordance with the invention;

FIG. 2 is a schematic elevational view, with parts shown in cross-section and parts broken away, of the producing and editing system of FIG. 1, taken substantially along the lines 2—2 in FIG. 1;

FIG. 3 is a schematic fragmentary perspective sketch of a portion of a cassette receiving receptacle in the producing and editing system of FIG. 1, taken substantially along the lines 3—3 in FIG. 1;

FIG. 5 is a fragmentary schematic plan sketch, with parts broken away, of a film strip forming a part of the cassette of FIG. 1;

FIG. 6 is a schematic elevational cross-sectional sketch of a film drive mechanism forming a part of the apparatus of FIG. 1, shown in conjunction with a portion of a cassette cooperating therewith;

FIG. 8 is a fragmentary schematic view of portions of the cassette and sound array of FIG. 4, showing elements of the sound array engaged with the film in the cassette;

FIG. 9 is a fragmentary schematic plan view, with parts omitted, parts shown in cross section, and parts broken away, of a blinder mechanism forming a part of the apparatus of FIGS. 2 and 7, in one position assumed during its operation;

FIG. 10 is a fragmentary schematic perspective sketch of a locating pin latching mechanism forming a part of the apparatus of FIG. 7;

FIG. 11 is a fragmentary schematic plan sketch, with parts omitted, parts shown in cross section, and parts broken away, of a locator pin and its actuating mechanism forming a part of the apparatus of FIG. 7;

FIG. 12 is a schematic cross-sectional elevation of a portion of the apparatus of FIG. 7 taken substantially along the lines 12—12 in FIG. 7 showing a pressure plate lifting mechanism in its cooperative relationship with a cassette;

FIG. 15 is a schematic elevational view of a recording, replay and editing control forming a part of the system of FIG. 1;

FIG. 16 is a fragmentary schematic view of a portion of the apparatus of FIG. 15, with parts omitted and parts shown in cross-section;

FIG. 17 is a schematic fragmentary cross-sectional view of a portion of the apparatus of FIGS. 15 and 16, taken essentially along the lines 17—17 in FIG. 16;

FIG. 18 is a schematic fragmentary view of another portion of the apparatus of FIG. 15, taken essentially along the lines 18—18 in FIG. 15.

Figure 4:
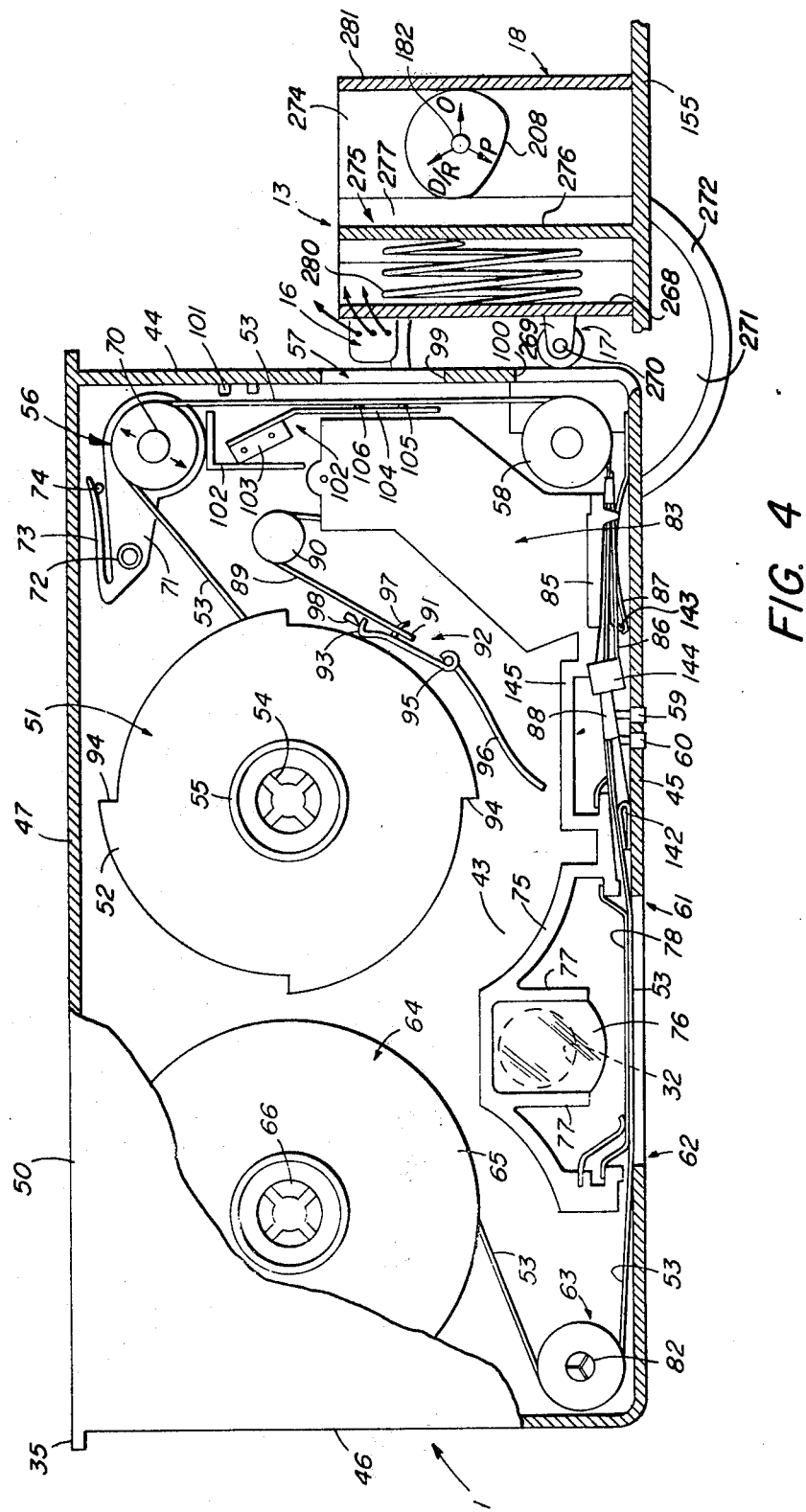
FIG. 4 is a schematic plan sketch, with parts omitted, parts shown in cross section, and parts broken away, of a film cassette in accordance with the invention, shown in conjunction with a sound array forming a part of the producing and editing system of FIGS. 1, 2 and 3.

FIG. 1 shows the external cooperative aspects of an audiovisual system embodying the invention. The basic elements of this system are a cassette 1, adapted to be inserted in a pocket 2 formed in the outer housing 3 of a sound motion picture producing system generally designated 4. A translucent viewing screen 5, on which projected images at times appear, is mounted at the front of the housing 3.

As best shown in FIG. 2, the pocket 2 has a floor 6 on which an aperture plate 7 is mounted. The aperture plate 7 is adapted to extend into the cassette such as 1 and there register with the film in the cassette. Light, supplied in a manner to be described, passes through the film, and thence over a path traversing a suitable framing aperture in the aperture plate 7, a cooperating recess in the floor 6, a blinder housing 8, to be described, and a conventional shutter 9, to a lens 10. The lens focuses an image of the portion of the film selected by the framing aperture on a mirror 11, whence it is reflected to the screen 5.

A speaker 12 is mounted in the housing 3 of the system 4 at the front and below the screen 5 as indicated schematically in FIG. 2. The speaker 12 is at times energized to produce sound recorded on the film in the cassette 1 in a manner to be described. For that purpose, a sound array generally designated 13 is mounted in the housing 3 just behind the pocket 2, and communicates with a cassette in the pocket 2 through an aperture 14, FIG. 3, formed in an end wall 15 of the pocket 2. The sound array 13 generally comprises a combined recording, playback and erasing head 16, and a film drive capstan 17, mounted on a suitable support generally designated 18, and to be described in more detail below, so that it can be moved into and out of engagement with film in the cassette 1.

As shown in FIG. 1, an editing control unit generally designated 19 is removably mounted on a stand 20 having a base 21. The control unit 19 comprises a microphone 22 mounted in a suitable housing 23 adapted to be grasped in the hands of the user, and provided with a replay push button IPB and a two-position record-listen push button RPB, constructed and arranged in a manner to be described in detail below. The unit 19 is electrically connected to the base 21 of the apparatus by means of a flexible cable 24, which may be continuously connected to a cable 25 that electrically connects the remote assembly to the housing 3. A volume control 26 mounted on the exterior of the housing 3 enables the user to select the volume produced by the speaker 12 in a manner to be described.

As shown in FIG. 1, the cassette 1 is provided with a number of light-baffled openings, 30, 31, 32, 33 and 34. These openings expose parts adapted to cooperate with corresponding parts of the film drive and projection system to perform various functions in the cassette. Thus, a drive sprocket formed on the takeup reel is accessible through the opening 30. A similar drive sprocket formed on the supply reel is accessible through the opening 31. Projection light is at times admitted to the cassette through the opening 32. A stop can enter, to brake a snubber roll forming a part of the cassette, through the opening 33. The opening 34 serves to admit a locating pin, forming a part of the motion picture producing and sound editing system to latch the cassette in position for manipulation, and to energize the producing and editing apparatus in a manner to be described.

A flange 35 is formed on the upper end of the cassette 1. This flange aids in grasping the cassette while inserting it in, or removing it from, the pocket 2. It also helps to fix the cassette in position in the producing and editing system, by engagement with the rim of the pocket 2.

Referring to FIG. 3, parts adapted to enter the openings in the cassette 1 just described at times enter the pocket 2 through corresponding openings in the side wall 36 of the pocket. Drive sprockets for the supply and takeup reels are adapted to enter through openings 37 and 38, respectively. A light beam for projection enters through an opening 39. The locating pin enters through an opening 40. The snubber roll stop enters through an opening 41.

In addition to the aperture plate 7 described above, the actuating arm of a normally open switch S1 is movably mounted on the floor plate 6. This switch is adapted to be closed when a cassette is inserted in the pocket 2, for purposes to appear.

A foot pedal 42 is movably mounted in the pocket 2 to be depressed by the insertion of a cassette. The foot pedal is connected to an actuating arm extending through the floor plate 6, as will be described below.

FIG. 4 shows, in part fragmentarily and in part schematically, the pertinent elements of an internally programmed cassette 1 adapted for use in the system of the invention. Except as modified in a manner to be described, the cassette may be constructed in the manner described in detail in the above-cited U.S. application Ser. No. 227,080.

The cassette comprises a housing formed of any suitable opaque material such as metal, plastic, or the like, and preferably manufactured in two cooperating parts.

The housing parts comprise a base plate 43 formed integral with side walls 44, 45, 46 and 47. The base plate 48 extends across the base of the side walls, and comprises one side of the housing, The walls 44, 45, 46 and 47 extend at least in part about the periphery of the base plate 43, and cooperate with interfitted walls, shown and described in the above-cited U.S. application Ser. No. 227,080, formed integrally with a cover generally designated 50. The cover plate 50 completes the upper side of the housing as seen in FIG. 4.

When the cover 50 is placed in position, it may be formed integral with the base plate and side walls by heat sealing, or by a suitable adhesive, or the like. If of metal, the inter-fitting parts may be interlocked with cooperating detents formed therein, in a manner conventional and well known to those skilled in the art.

The base and cover parts form, when assembled, the end flange 35 that serves to support and locate the cassette 1 in either a camera, or in the motion picture producing and editing system of FIG. 1.

Rotatably disposed within the cassette housing is a supply reel generally designated 51. The reel 51 is provided with an upper flange 52 and a corresponding lower flange, not shown, to guide a film strip 53 as it is wound about the spool portion of the reel 51, not shown, to which one end of the film strip 53 is attached.

A sprocket schematically indicated at 54 may be formed integral with the reel 51 to adapted the reel to be driven about its axis of rotation. Access to the sprocket 54 may be provided through the aperture 31 in the cover plate 50 (FIG. 1), light-baffled by suitable conventional annular flanges, such as 55, formed on the upper surface of the flange 52 (FIG. 4), and cooperating with corresponding coaxial flanges, not shown, on the inner side of the plate 50. The lower flange of the reel 51 may be formed in a conventional manner with a cylindrical axial opening to receive a cooperating axle, not shown, formed integral with the base plate 43.

Initially, the film 53 is in its unexposed state and coiled primarily about the supply reel 51. It is shown in FIG. 4 in the position assumed as it nears the end of its movement away from the supply reel, as toward the end of exposure in a camera, in which it is nearly exhausted from the reel 51.

In its path from the supply reel 51, the film 53 first encounters a bobulator roll 56. The film engages a portion of the periphery of the bobulator roll, as shown, and passes therefrom into a suitably light baffled sound recording and reproducing station generally designated 57. The sound station terminates with the passage of the film 53 over a backup roller 58. The film is at times engaged by the capstan 17 acting through the film against the roller 58, whereupon the film is driven smoothly through the sound station, as will appear.

The roller 58 is journalled for rotation in the cassette housing. From the roller 58, the film 53 passes through film processing means, to be described below. In addition to the apparatus for processing the film in a manner to be described, the film processing means comprises a signal generator for producing an external condition signal on terminals schematically indicated at 59 and 60, to indicate whether or not the processing means has been actuated.

Beyond its path through the film processing means, the film 53 extends through a conventional light-baffled aperture schematically indicated at 61 and forming a portion of a film gate in the housing. The film 53 reenters the housing through a second light-baffled aperture generally designated 62 and comprising a second portion of the film gate.

The film 26 next passes over a conventional snubber roll, generally designated 63, and finally passes to a takeup reel generally designated 64, comprising a spool portion to which the takeup reel end of the film is connected, and about which the film is wound as suggested in FIG. 4.

In addition to parts corresponding to those parts described in connection with the supply reel 51, the takeup reel 64 comprises an external upper flange 65 protruding beyond the maximum radius of the film 53 when substantially stored on the takeup reel. On the flange 65 is formed a suitable drive sprocket 66, by means of which the film can be selectively advanced in a manner to be described.

The bobulator may be of any conventional construction suitable for the performance of the known function of isolating the film drive pawl associated with the camera from the inertia of the supply reel 51. However, it is preferably of the form shown, in which the bobulator roll 56 is journalled on a pin 70 for rotation by the film.

The pin 70 is formed integral with a support 71 of plastic or the like. The support 71 is journalled to the base plate 43 by means of a pin 72 formed integral with the base plate, and biased by a spring 73 formed integral with the support 71. The spring 73 acts against a post 74 formed integral with the base plate 43. The bobulator roll 56 can thus both rotate about the pin 70, and move backwards and forwards in the directions of the double arrow, shown in FIG. 4.

The bobulator roll responds to increases or decreases in the tension of the film 53 by temporarily shortening or lengthening the film path, respectively. Such changes in film tension are produced by the actuation of the film drive pawl in the camera, and are determined by the inertial forces exerted by the supply reel 51, together with the larger or smaller supply of film that may be on it at any given time. By that arrangement, as the film is advanced incrementally by the pawl associated with the camera, it can rapidly move the bobulator roll against the spring 73 without immediately affecting the supply reel, which can then more or less gradually allow the bobulator roll to relax while supplying the segment of film taken by the pawl. As mentioned above, the film is driven smoothly through the sound station by the capstan 17, so that the bobulator functions only as an idler in the motion picture producing and sound editing system of the invention.

A lighttight shield around the film gate formed by the apertures 61 and 62 is formed by a wall portion 75 formed integral with the base plate 43 and made integral with the cover plate 50 after assembly of the parts in the manner described above. An exposed chamber behind the film 53 is thus formed for the purpose of admitting projection light.

The apparatus for this purpose is conventional, and will only briefly be described. In short, it comprises a prism generally designated 76 and comprising a mirror, not shown, but disposed at 45° to the plane of FIG. 4. As schematically indicated, the prism 76 is mounted between extensions 77 formed on the wall 75.

Light enters the cassette through the port 32 formed in the cover plate 50 in directions normal to the plane of FIG. 4. The mirror in the prism 76 directs this light downwardly through the film 53 in the film gate for the projection of images on the film through the lens 10 (FIG. 2).

Also disposed in the chamber bounded by the wall member 75 and the film passing through the film gate is a conventional pressure plate 78, located between the prism and the film, and biased by a spring 79 into engagement with the film. The spring 79 is supported and retained by suitably shaped extensions of the support wall 75, as shown.

The pressure plate serves in the conventional manner to cooperate with a camera, by locating the focal plane of the film during exposure. An aperture, not shown, is provided in the pressure plate 78, to pass light entering through the prism assembly 76 through a selected frame of the film 53, after the film is processed in a manner to be described. It is preferred that the aperture in the pressure plate be somewhat larger than the frame to be projected so that the aperture in the aperture plate 7 (FIGS. 2 and 3) serves as the limiting aperture bounding the projected frame.

The snubber roll 63 may also be of entirely conventional construction. As illustrated, it is provided with a hub portion schematically indicated at 82 that is adapted to protrude through the (suitably light-baffled) aperture 33 in the cover panel 50 for engagement by a stop member, comprising a part of either the camera or of the motion picture producing and editing system. The stop member engages the snubber roll when the film is to be incrementally advanced by a pawl for exposure or projection purposes. The cooperation between the snubber roll 63 and the takeup reel 64 is conventional, but will be briefly described.

The drive sprockets 54 and 66 of the supply and takeup reels 51 and 64, respectively, are adapted to be engaged by corresponding drive sprockets comprising a part of a camera, or of the producing and editing apparatus to be described. In the producing and editing apparatus, both supply and takeup reels are adapted to be driven through slip clutches. In the camera, only a drive for the takeup reel need be provided. This drive comprises a slip clutch connected to a sprocket driving the takeup reel drive sprocket 65, in cooperation with a drive pawl for sequentially engaging a series of the sprocket holes 38 formed in the film 26, along a portion of the edge of the film in the film gate between the apertures 60 and 61.

When the snubber roll 62 is stopped by engagement of the hub 82 as described above, operation of either the camera or of the production and editing system to incrementally advance the film towards the takeup reel, by engagement of a pawl with the sprocket holes in the film 26, will momentarily loosen the film from engagement with the stationary snubber roll 62 and allow the slip clutch driving the takeup reel 63 to takeup that increment of the film advanced by the pawl. Between engagements of the pawl, the slip clutch prevents the takeup reel from advancing the film.

In the production and editing system to be described, the snubber roll 63 is engaged only while the film is to be incrementally advanced onto the takeup reel. When the film is rewound onto the supply reel, the snubber roll 63 is disengaged and acts as an idler. As will appear, that may occur either during the processing of the film while rewinding, or during subsequent rewinding of the processed film after projection.

The film processing means may be as described in the above-cited U.S. application Ser. No. 227,080, except as modified in a manner to be described. As shown in FIG. 4, the apparatus generally comprises wall means comprising portions of, or formed integral with, the base plate 43 and the cover plate 50, which serve to guide, support and house the various elements of the processing apparatus to be described. These walls form an outer film composition containing housing generally designated 83, defining a chamber in which there is mounted an initially sealed container of processing composition as fully described in the above-cited U.S. application Ser. No. 227,080. The container 83 communicates with a coating nozzle generally designated 85. These elements are mounted above the plane of the film 53.

Principally located below, but in part surrounding, the film 53 is a pressure pad generally designated 86. The pressure pad is acted on by a spring, generally designated 87, as fully described in the above-cited U.S. application Ser. No. 227,080.

The basic elements of the processing station further comprise a combined metallic pressure pad deflection can and nozzle closure valve assembly generally designated 88, and the pair of electrical terminals 59 and 60 mentioned above. The terminals 59 and 60 are bridged by the valve assembly 88 before the film is processed to provide a low impedance electrical signal. The valve assembly 88 is moved after the film is processed to open the circuit path between the terminals 59 and 60 to produce a high impedance between the terminals 12 thereafter, as fully described in application Ser. No. 227,080.

A pod of processing composition within the container 83 is initially sealed by one end of a tear-tab generally designated 89. The tear-tab 89 extends from sealing engagement with the plastic pod of processing composition in the container 83, out through a suitable slot in the container 83, and over a roller 90 in the cassette housing to an end 91 connected to a release arm generally designated 92.

The release arm 92 may be formed of thin sheet spring metal, bent over at one end 93 to form a hook adapted to engage one of a set of teeth 94 formed on the flange 52, and corresponding teeth formed on the lower flange of the supply reel 51. The arm 92 is secured at one end to a pin 95 that is adapted to slide in curved guide slots such as 96, one formed in the base plate 43, and the other, not shown, in the cover plate 50. A hook 97 on the release arm 92 extends through a suitable aperture in the tear-tab 91. When the supply reel is rotated counterclockwise as seen in FIG. 4, as during exposure of the film in the camera, the hook 93 formed on the arm 92 is not engaged by the teeth 94, but is simply brushed up into engagement with a fixed support 98 secured to the base plate 43. On the other hand, when the supply reel 51 is first rotated clockwise as seen in FIG. 4, as to rewind the film on the supply reel, one of the teeth 94 catches the hook 93 and drives the arm 92 downward under the guidance of the slots 96, pulling the tear-tab 89 partly out of the container 83 and releasing the processing composition in the manner fully described in the above-cited copending application Ser. No. 227,080. The arm 92 will carry the tear-tab down until it is moved out of engagement with the supply reel 51 as the slot 96 diverges from the path of the teeth 94. This arrangement replaces the more complex mechanism described in the cited application Ser. No. 227,080, and relies on the fact that once the film is exposed, it will not be rewound on the supply reel until it is desired to process it.

As indicated, the end wall 44 of the cassette 1 is modified by the provision of a first aperture 99, adapted to receive the sound head 16, and a second aperture 100, adapted to admit the capstan 17 and to permit the escape of a small loop of film in a manner to be described. A container 83 and walls such as 75 in the lower side of the cassette housing serve as light shields for the openings 99 and 100 over that region of the cassette. Additional light baffles suggested as ribs 101 and a wall 102 defining the upper end of the sound station 57 serve to provide light baffles for film beyond that station in the upper directions.

A backup spring generally designated 102 is mounted behind the film in the sound station 57. The spring is formed with one end bent over as indicated at 103 and there secured to the base plate 43. An extending arm 104 of the spring carries a pair of raised film engaging portions 105 and 106 that serve to receive and support the film 53 as the head 16 is moved into engagement with it in a manner to be described. Spacing of the raised portions 105 and 106 causes a desirable partial wrapping of the film 53 around the sound head 16.

As in the photographic system described in U.S. application Ser. No. 227,080, the system of the invention makes use of a photofinishing process in which the strip of film 53, following exposure in the camera, is contacted with a single processing composition to form a finished transparency from the latent image or images formed on the film during its exposure. In order to provide sound recording and reproducing capabilities, a magnetic sound track is provided along one or both edges of the film, as will next be described with reference to FIG. 5.

As shown in FIG. 5, the film strip 53 comprises a leader 110 terminating at an end formed with an aperture such as 111. The aperture 14 serves to connect that end of the film to the takeup reel 64.

Behind the leader, which may be in the neighborhood of 18 inches in length, there is a strip 112 of photographically useful film, upon which projectable images may be formed. The strip 112 may be, for example, approximately 50 feet in length for 8 mm film.

Following the photographically useful portion of the film is a trailer region generally designated 113. The trailer 113 terminates at another end formed with an aperture 114 by means of which that end of the film is adapted to be connected to the supply reel 51.

The film 53 may comprise a base of any suitable transparent material of the kind conventionally used for film bases. On this base is applied, at least over the central portion of the photographically usable length of the film 112, an emulsion comprising a photosensitive coating, whereon a series of latent images illustrated by a series extending from a first frame 115 to a last frame 116 may be formed with a camera. The photosensitive coating is preferably of one of the forms, next to be described, which can subsequently be processed to form a projectable image on the film base.

Photosensitive coatings usable in the practice of the invention may be of any conventional variety adapted to be developed by a monobath processing composition to form a positive transparency suitable for projection. In particular, a currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the projection of black and white images, a silver halide developer and a silver halide solvent are applied in an aqueous alkaline solution to a photoexposed silver halide emulsion stratum, where they develop exposed silver halide to silver, and react with unreduced silver halide to form a soluble silver complex. This complex, in order to form a positive print, is transferred and reduced to silver on a silver-receptive stratum upon which the silver halide stratum has been superposed.

In one practice, in the completion of this process, the silver-receptive and silver halide strata have been separated in order to render the positive print visible. However, as indicated above, the positive print may be rendered visible without separation of the silver halide and the silver-receptive strata. For example, the silver-receptive stratum may be so constructed as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are contained on a transport support. Since the silver halide stratum and the silver-receptive stratum need not be separated, an overall simplification of the silver transfer reversal process is achieved.

A composite film assembly of this type, as well as processing compositions for producing a fully developed black and white image without the necessity of removing the developed negative image after processing, are shown in U.S. Pat. No. 2,861,885 to Edwin H. Land, which issued on Nov. 25, 1958, for Photographic Processes and Products. Other composite film assemblies capable of producing developed full color images without the necessity of removing the developed emulsion are shown in the patents of Edwin H. Land, U.S. Pat. Nos., 2,726,154, issued Dec. 6, 1955, for Photographic Product, and 2,944,894, issued July 12, 1960, for Photographic Processes Utilizing Screen Members.

It should be noted that the invention is not directed to the chemistry by which images are developed in a photosensitive emulsion and transferred to an image receiving stratum. However, in the practice of the invention, whether the film employed is black and white or color film, at the present time the preferred embodiment of the invention employs film of a type not requiring the removal of a negative emulsion after it is developed.

Referring again to FIG. 4, the film 53 is formed along one edge with sprocket holes such as 117 at regular intervals adapted to cooperate with a drive pawl, in a manner to be described, in either camera or projector, for incremental advancement of the film. The series of sprocket holes 117 adjacent the trailing end of the film may be interrupted by a first elongated sprocket hole 118. This elongated hole 118 may span, for example, two of the sprocket holes 117.

Further along the film in the direction of the supply reel end, the series of sprocket holes 117 is again interrupted by a second elongated sprocket hole 119, longer than the sprocket hole 118 and, for example, spanning three of the sprocket holes 117. As will appear, the first elongated sprocket hole 118 establishes an exposure end point in the camera, whereas the second sprocket hole 119 determines a film takeup termination point in the producing and editing apparatus to be described.

Basically, termination of film advance at the first elongated sprocket hole 118 is attained by the use of a single drive pawl in the camera, which sequentially engages the sprocket holes 117 to advance the film by one frame length in a conventional manner. Toward the end of each such advance stroke, as is conventional, the pawl is cammed down out of engagement with the film. When the single pawl engages the elongated aperture 118, the camming down movement occurs before the film engages the leading edge of the elongated hole. The pawl may cycle repeatedly thereafter without further advance of the film. This serves to effect a termination of film advance for the purposes of exposure adjacent the end of the region of photographically useful emulsion, to alert the photographer, by the somewhat different sound produced when the pawl skips the film, that his cassette should be replaced.

The film drive system for projection purposes is provided with a double pawl, comprising two integral pawls spaced apart by one frame length, each pawl being of the same shape as the single pawl in the camera. When the first elongated aperture 118 is encountered, the leading pawl of the pair serves to engage the leading edge of the aperture 118 to cause the film to be advanced without interruption. For normally spaced sprocket holes 117, both of the pawls engage the film in sequential sprocket holes. However, when the second elongated sprocket hole 119 is encountered, the pawls will pass through it without film engagement, and thereby terminate film advance in the same manner as did the single pawl upon engagement of the double length sprocket hole 118.

Formed on the trailing end 113 of the film 53, beyond the exposure advance termination portion just described in the direction of the supply reel end of the film 53, is a detent engaging element here shown as an aperture 120 formed in the film, adjacent which a projecting bump 121 is formed, as by pressure, heat and pressure, or the like. The edge of the bump 121 forms a hook adapted to engage a detent in the form of a process control actuating element, to be described, as the film is moved with respect to the detent in the direction of the takeup reel.

Formed on the leader end 110 of the film 53 is another detent engaging means, here shown as an aperture 124 in the central region of the film. This aperture serves to actuate the valve member 88 forming a part of the processing apparatus described above, for purposes to appear.

Formed on the sides of the film 53, on the base side opposite the side on which the emulsion is coated, are a pair of side rails 122 and 123. At least the rail 123 is coated with a conventional ferromagnetic recording medium so that the rail 123 serves as a soundtrack for recording and reproduction. The rails 122 and 123 protrude slightly above the surface of the film 53, and serve two basic purposes in the system of the invention. First, when the fluid is processed as to be described, it is initially wet over the useful emulsion region as it is transferred from the processing station to the supply reel. The rails serve to keep the wet surfaces of the emulsion from contacting the dry base surface of the film as it is wound on the reel. The use of the rail 123 as a recording surface also makes it possible to maintain contact between the sound track and the transducer head without exerting pressure on the emulsion side of the film.

A capstan wear pad 125, of plastic or the like, is preferably cemented to the trailing end 113 of the film behind the bump, on the side where the rails 122 and 123 are located. This wear pad 125 prevents the capstan 17 from wearing a hole through the film 53 under conditions to be described.

The manipulation of the film in the cassette 1 to process it after it has been exposed is fully described in the above-cited copending application Ser. No. 227,080. However, in order to visualize this process in conjunction with the sound recording and reproducing features of the system of the invention, it will next be briefly described with reference to FIGS. 1–5.

Referring to FIG. 4, it will be assumed that an initially unexposed strip of film 53 stored primarily on the supply reel 51 has been exposed in a camera, so that it has been advanced onto the takeup reel 64 to the exposure termination point determined by the first elongated sprocket hole 118 in the film (FIG. 5). The tear-tab 89 and its release mechanism will be in the positions shown in FIG. 4, with the hook 93 against the stop 98.

Next, assume that operation is continued by further rotation of the takeup reel 64 counterclockwise, as seen in FIG. 4, to bring the film 53 farther onto the takeup reel. During this rotation, the supply reel 51 will move counterclockwise in FIG. 5, causing the teeth 94 to pass the hook 93 without effective engagement therewith.

FIG. 4 shows the parts of the coating station in their initial position, which is maintained during exposure of the film and during a portion of the first increment of motion just described, from the exposure termination point toward the second termination point in which the film is substantially exhausted from the supply reel, and in which the second elongated sprocket hole 119 in FIG. 5 will be encountered. During the interval of travel between those positions, and prior thereto, the cam and nozzle closure plate assembly 88 is detachably held in place in the manner described in copending U.S. application Ser. No. 227,080, and a film engaging hook 142 formed on the assembly 88 is lightly engaging the base of the film 53.

The pressure pad 86 is initially held in place by engagement of an integrally formed hook 143 with a detent formed on the end of the spring 87. In that position, the end of the pressure pad 86 lightly engages the base of the film 53 and ears 144 formed on the pressure pad are in engagement with a ledge formed on a wall segment 145 formed integrally with the wall 75.

The parts of the coating station will remain in the position shown in FIG. 4 until, during the further advance of the film 53 towards the takeup reel, the film engaging bump 121 approaches and engages the end of the pressure pad 86. When that occurs, near the second termination point established by the second elongated hole 119 in the film (FIG. 5), the bump 121 will move the pressure pad to the left in FIG. 4, to a position in which the ears 144 have moved out of engagement with the ledge on the wall 145, and upwardly under the influence of the spring 87. The pressure pad 86 will swing up into engagement with the film 26 and carry the emulsion side of the film into coating engagement with the nozzle 85, as described in the above-cited copending application Ser. No. 227,080.

Next, assume that the first rewind operation is begun, by rotating the supply reel 51 clockwise in FIG. 4, to advance the teeth such as 94 towards the book 93 on the release arm 92. Further clockwise movement of the reel 51 will cause the teeth 94 to drive the release arm 92 downwardly and to the left in FIG. 4, pulling the tear-tab 89 to release processing composition to the coating nozzle 85. The composition will then be uniformly coated on the emulsion side of the film 53.

The coating operation will continue as the film is rewound onto the supply reel until the processing composition is substantially exhausted, and the film is stored substantially all on the supply reel 51. Toward the end of that operation, the aperture 124 (FIG. 5) will approach and engage the hook finger 142 formed on the valve and cam assembly 88.

As the film 53 continues to move onto the supply reel, engagement of the aperture 124 in the film with the spring arm 142 will carry the cam and valve member 98 to the right of the position shown in FIG. 4, bringing cams formed on the member 88 into contact with the pressure pad 86 in the region of the ears 144, with the cam assembly 88 being guided by the ears 144, as the assembly 88 moves to the nozzle closing position.

Movement in this direction will continue to move the assembly 88 to the right, as it goes to a position in which the end of the valve assembly 88 closes the nozzle 85. The cam assembly 88 and pressure pad 86 are then latched in a final position as described in application Ser. No. 227,080.

During its movement from the position shown in FIG. 4 to the final position just described, the cam and valve assembly 88 disengages the contacts 59 and 60, and thus provides a signal indicating that the film has been processed.

FIG. 6 schematically illustrates the film advance pawl mechanism in operative relation to the film 53 in a cassette 1 inserted in the pocket 2 of the producing and editing system (FIG. 3), with the film gate in registry with the aperture plate 7. The apparatus comprises a pair of film drive pawls 127 and 128 formed on a lever generally designated 129. The pawls 127 and 128 are adapted to engage sequential sprocket holes 117, to advance the film incrementally. For that purpose, the lever 129 is pivoted as indicated at 130 to a crank arm 131. The crank arm 131 is fixed to a shaft 132 that is at times driven synchronously by an AC motor, to be described.

As shown, the lever 129 passes through a suitable aperture 133 formed in the floor plate 6, and thence through a slot 134 in the aperture plate 7 into engagement with the film. An end 135 formed on the lever 129 rides on a pin 136 secured to the floor plate 6. Thus, as the crank 129 rotates, the pawls 127 and 128 drive the film 53 to the left in FIG. 6 until they are brought down out of engagement with the film in response to rotation of the crank arm 129. Thereafter, the pawls are brought up beneath the plane of the film, as suggested by the dotted lines in FIG. 6, back to a position in which they can engage the next pair of sprocket holes 117, and then undergo another advance stroke.

A projection 137 formed on an extension 138 of the hub of the crank arm 131 is adapted to releasably engage a detent 139 urged against the hub 138 by a spring 140 compressed between the detent 139 and a fixed support 141. That causes the pawl to stop in the dotted line position, out of engagement with the film, when the drive for the shaft 132 is disengaged in a manner to be described.

As described above, when the pawls 127 and 128 engage an elongated sprocket hole such as 118 in FIG. 4, the film will continue to be advanced. However, when a more elongated sprocket hole, such as 119 in FIG. 5, is encountered, having a spacing equal to three of the sprocket holes 117, both pawls 127 and 128 will fail to engage the film, and film advance will cease, even though the shaft 132 continues to rotate.

Further details of the motion picture producing and sound editing system will next be described with reference first to FIG. 7. As there shown, the pocket 2 that is adapted to receive the cassette described above is, in part, formed in the housing 3 by two walls described above; i.e., the floor plate 6 and the wall 36 normal thereto, through which certain cooperating parts of the system extend. The pocket 2 is further defined by an end wall 148 and a side wall 149 opposite the wall 36. As described above in connection with FIG. 3, there is an end wall segment 15, not shown in FIG. 7, opposite the end wall 148. Along the wall 149 are mounted a pair of suitably insulated contacts 150 and 151 that are adapted to engage the contact terminals 59 and 60 formed on the cassette.

Figure 7:
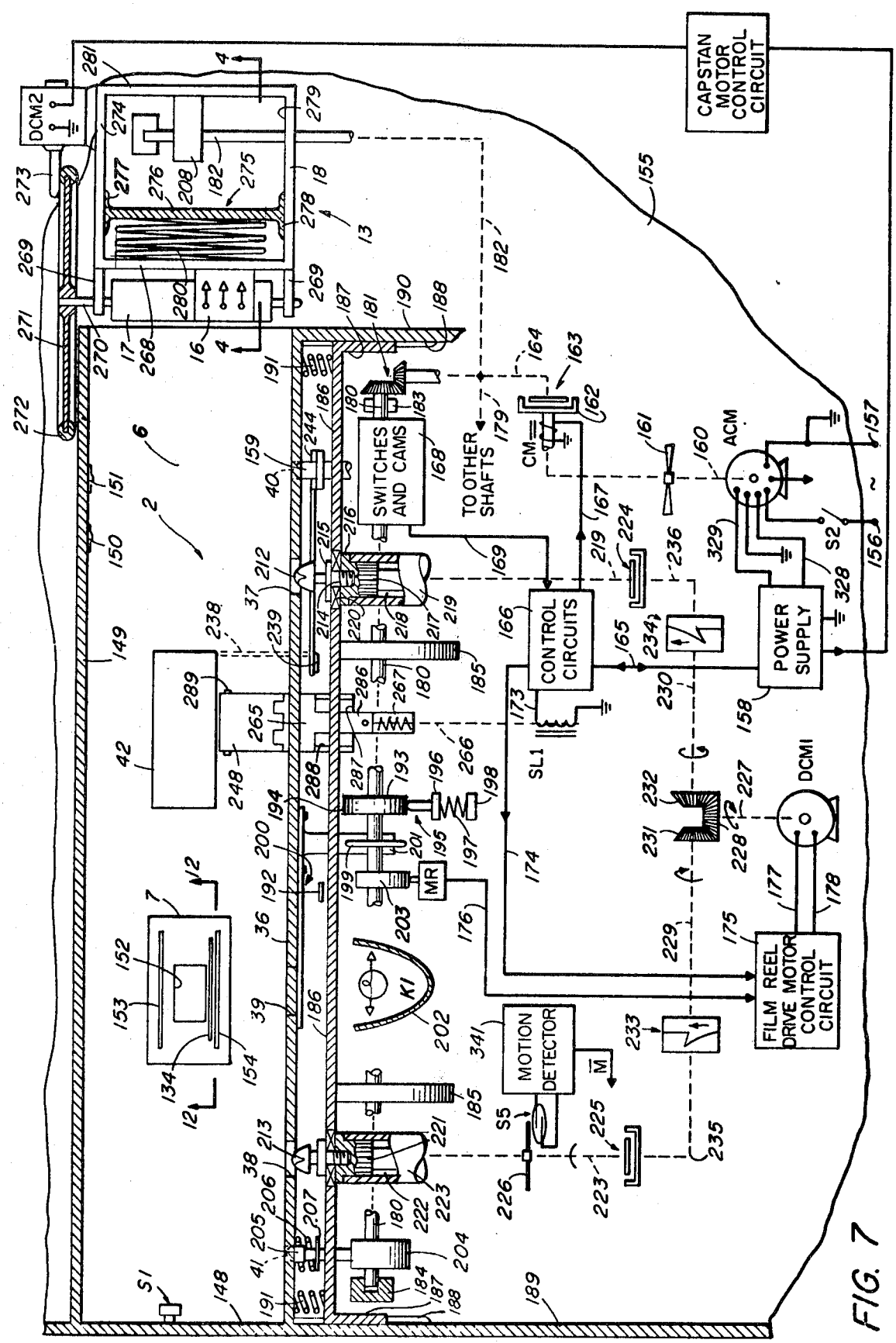
FIG. 7 is a schematic fragmentary plan view, with parts shown in cross section, parts omitted, and parts broken away, illustrating a portion of the producing and editing system of FIG. 1.

The aperture plate 7 referred to above that is mounted on the floor plate 6 is shown in FIG. 7 to comprise a framing aperture 152 that defines the margins of the portion of the film in the cassette to be projected. Beside this aperture 152 is the slot 134 through which the film drive pawl, described above, is adapted to protrude for engagement with the film in a cassette in the pocket 2. Another symmetrical pair of slots 153 and 154 are formed in the aperture plate 7. There slots are adapted to receive a pair of pressure plate raising arms, to be described, which serve at times to disengage the pressure plate 78 of FIG. 4 from the film 53, for purposes to appear.

A floor plate 155 is formed integral with the housing 3, coplanar with the floor plate 6 and normal to the wall 36. On this plate 155 are mounted most of the operative parts of the system to be described.

Energy for the system is arranged to be supplied from a suitable source of alternating current, such as a 60Hz, 120 volt source, connected to a pair of terminals 156 and 157. The terminal 157 is shown connected to a reference ground, for convenience, and the terminal 156 is connected over contacts of an on-off switch S2 to mechanical and electrical power supply elements here shown schematically in FIG. 7 as a conventional DC power supply 158, and a conventional combined AC motor and transformer ACM. As will appear, the switch S2 is normally open, and is closed by a locator pin 159 when a cassette is inserted in the pocket 2 and the locator pin extends into the cassette to latch the cassette in the pocket.

The motor ACM may be of the conventional shaded pole induction type, having an energizing primary winding with a tap for energizing a projection lamp, to be described, and secondary windings connected to the DC power supply. These windings of the motor will be more particularly described below.

The output shaft 160 of the motor ACM drives a fan schematically indicated at 161, and also drives the input side 162 of a conventional electromagnetic clutch 163 having an output shaft 164. The shaft 164 is adapted to be driven from the shaft 160 through the clutch 163 when a clutch magnet CM is energized in a manner to appear. Another electromagnetic clutch, to be described below and not shown in FIG. 7, is driven by the shaft 160, for purposes to appear.

The fan 161 supplies air for cooling a projection lamp, to be described, and may also be used to supply air to the cassette to aid in drying the film after it is coated with processing composition.

The power supply 158 provides DC voltages for energizing various other elements of the apparatus, as will appear. In particular, the power supply 158 is connected over leads schematically indicated at 165 to control circuits schematically shown at 166.

The control circuits 166 at times supply energizing current for the clutch magnet CM over a lead 167. Control inputs are provided to the circuits 166 by switches and cams schematically indicated at 168, over leads generally designated 169. The control circuits 166 at times provide energizing current over a lead 173 to energize a cassette ejector disabling solenoid SL1. Other circuits, schematically indicated at 174, affect the operation of a film reel drive motor control circuit generally designated 175.

The motor control circuit 175 is also influenced by a motor reversing switch MR that performs its control function over leads schematically indicated as a single lead 176. The output of the motor control circuits 175, illustrated at 177 and 178, is supplied to energize a conventional DC motor DCM1 to cause it to rotate in either of two opposite directions, in a manner to appear.

The shaft 164, driven by the motor ACM when the clutch magnet CM is energized, serves as the main programming shaft for directing the operation of the film drive, projection and audio recording and reproduction system under the influence of mechanical and electrical signals supplied by the cassette. Auxiliary shafts schematically indicated at 179 are driven by the shaft 164 as will be described in further detail below. A main cam shaft 180 is driven from the shaft 164 by means schematically shown in FIG. 7 as a pair of bevel gears 181. An additional shaft 182 is driven by the shaft 164 synchronously with the shaft 180, to control the sound array in a manner to be described below.

The shaft 180 is supported in bearings schematically indicated at 183 and 184, fixed with respect to the plate 155. Carried on the shaft 180 are a number of cams, several of which control switches, to be described. In particular, the switches and cams 168 are driven by the shaft 180, and comprise a number of elements to be described below in conjunction with FIG. 13. Only those parts are shown in FIG. 7 which are conveniently displayed in fragmentary and schematic form, to illustrate the functional relationship between the elements of the system and indicate their relative location.

Two drive control cams 185 are symmetrically disposed on the shaft 180 and affixed thereto. These cams serve at times to drive a spindle plate 186 towards the wall 36.

The spindle plate 186 comprises a bar of metal or the like, provided with integral guide flanges 187 at its ends. The flanges 187 are slidable in ways, suggested at 188, formed integral with walls 189 and 190.

The spindle plate 186 is normally urged to the position shown in FIG. 7 by a pair of compression springs 191 located between the wall 36 and the spindle plate 186. When so moved by the cams 185, the spindle plate moves toward the wall 36, where it may be latched at times by a stop 192, as described in detail in the above-cited copending application Ser. No. 227,080.

Also carried on the shaft 180 is a program disc 193 formed with three slots 194 disposed 120 degrees apart on the disc. These slots serve to locate program stops, as shaft angles on the cam shaft 180, by engagement with a detent schematically shown at 195. The detent 195 comprises an element 196 adapted to engage the slots 194, and urged into engagement therewith by a spring 197. The spring 197 extends between the element 196 and a support 198 fixed to the plate 155.

A blinder control cam 199 is disposed on the shaft 180 and affixed thereto. It is arranged to operate a blinder generally designated 200 through a cam follower 201 formed integral with the blinder 200 and adapted to engage the cam 199. This blinder and its operating mechanism are more fully described in the above-cited U.S. application Ser. No. 227,080.

The blinder 200 at times interrupts the supply of light from a projection lamp K1. The lamp K1 is disposed in a reflector generally designated 202 that is mounted on the plate 155 to direct light from the lamp through the port 39, for admission to a cassette in the pocket 2.

A motor control cam 203 is mounted on the shaft 180 and serves to control the position of the motor reversing switch MR. That relationship will be described below in more detail in connection with FIG. 14.

A snubber engaging cam 204 is fixed to the shaft 180. This cam at times drives a snubber stop 205 through the port 41 in the wall 36 for engagement with the snubber hub 82 in a cassette inserted in the pocket 2. The snubber stop 205 is normally urged back into the port 41 by means of a spring 206 acting between the wall 36 and a collar 207 formed on the snubber stop.

A cam 208 for controlling the position of the sound array 13 is mounted on the shaft 182 to be driven synchronously with the snubber control cam 204. The cams 204 and 208 may be shaped and orientated, in a manner to be described, so that the sound array and the snubber stop are engaged and disengaged simultaneously.

A drive sprocket 212 for the supply reel of a cassette in the pocket 2, and a drive sprocket 213 for the takeup reel, are mounted on the spindle plate 186. These drive sprockets are adapted to protrude through the ports 37 and 38 in the wall 36 when the spindle plate 186 is driven toward the wall 36 by the cams 185.

The sprocket 212 is formed integral with a shaft 214. A collar 215 is formed integral with the shaft 214. Another collar 216 is detachably secured to the shaft 214 by means schematically shown as cooperating threads formed on the parts. This collar 216 may be integral with a splined extension 217 that engages corresponding splines 218 formed in a cylindrical bore in the end of a drive shaft 219.

The shaft 214 and the collars 215 and 216 cooperate with bearings schematically indicated at 220, mounted in the spindle plate 186 to allow the shaft 214 to rotate in the spindle plate, while preventing it from being translated along the axis of the shaft 214 with respect to the plate 186. The splines 218 and the splined extension 217 cooperate to allow the shaft 214 to be driven by the shaft 219, while allowing relative translational motion between the shafts 214 and 219. Thus, the shaft 214 may be fixed relative to the base plate 155 against translational motion, while rotatable with respect thereto.

The sprocket 213 may be rotatably mounted against translational motion in the spindle plate 186 by means identical to those just described with respect to the sprocket 212. A translational coupling is provided comprising splines 221 affixed to the sprocket 213 and cooperating with splines 222 formed in a shaft 223, in the manner described above, to allow the sprocket 213 to be drivably connected to the shaft 223 while free to slide axially with respect thereto. The shaft 223 is also translationally fixed relative to the plate 155, but mounted for rotation thereon.

The shaft 219 is connected to one side of a conventional slip clutch 224, and the shaft 223 is similarly connected to one side of a conventional slip clutch 225. Each of the shafts 219 and 223 is at times driven through its associated slip clutch, and at other times is driven from the associated sprockets 212 and 213, as will appear.

A vaned ferromagnetic element 226 is mounted on the shaft 223 for rotation therewith, carrying its vanes past a conventional magnetic reed switch S5 such that the switch S5 is opened and closed a number of times during each revolution of the shaft 223. The switch S5 provides an input signal to a motion detector, in a manner fully described in the above-cited U.S. application Ser. No. 227,080.

The slip clutches 224 and 225 are arranged to be driven at times by the DC motor DCM1 through means next to be described. As schematically indicated, the motor DCM1 is provided with an output shaft 227. The shaft 227 drives a bevel gear 228. The gear 228 drives a pair of shafts 229 and 230 in opposite directions through bevel gears 231 and 232, respectively. The shaft 229 is connected to one side of a conventional one-way clutch schematically indicated at 233, and the shaft 230 is connected to one side of a conventional one-way clutch 234.

When the shaft 229 is rotated in the direction of the arrow in FIG. 7, the clutch 233 will be engaged and drive the slip clutch 225 through a shaft 235. When the shaft 229 is rotated in the opposite direction, the clutch 233 will be disengaged. Similarly, when the shaft 230 is rotated in the direction of the arrow in FIG. 7, the clutch 234 will be disengaged. When the shaft 230 is rotated in the opposite direction, the clutch 234 will be engaged to drive the shaft 219 through the slip clutch 224 by means of an intermediate shaft 236.

The foot pedal 42 mounted adjacent the floor plate 6 in the pocket 2 will next be described in its relation to the locator pin 159, with reference to FIGS. 7 and 10. As best shown in FIG. 10, the foot plate 42 is provided with a downwardly depending arm 37 which extends through a suitable aperture in the floor plate 6 to a transverse arm 238, formed integrally with the foot plate 42 and the arm 237, and extending over beneath the wall 36 to an upwardly extending arm 239.

The arm 239 extends up through a suitable aperture in the base plate 155 to an end 240 formed integrally therewith. The end 240 is connected to a lever 241. The lever 241 is spaced at one end from the base plate 36 by means of a conventional spacer 242, and is pivoted to the wall 36 by a pin 243. At the oppostie end, the lever 241 is formed with upstanding yoke arms 244 that surround the port 40, through which the locator pin is adapted to protrude.

The lever 241 is spaced from the wall 36 at the end adjacent the yoke arms 244 by a spacer 245 secured to the wall 36. When the foot pedal is depressed, the lever 241 is rotated to carry the yoke arms 244 out of the way of the recess 40, for purposes to appear. The lever 241 and interconnected parts, including the foot pedal 42, are urged into the position shown in FIG. 10 by a spring 246 secured to the base plate 155 by means schematically indicated at 247.

Referring next to FIG. 11, the locator pin 159 is formed integral with a collar 250 that engages the yoke arms 244 in the position of the floor plate 42 shown in FIG. 10 and described above. The pin 159 is urged toward the port 40 by a spring 251 compressed between the collar 250 and a support 252 affixed to the floor plate 155 and slidable with respect to the pin 159.

A second collar 253 is formed on the end of the locator pin 159, and is adapted to operate the switch S2, to close a pair of normally open contacts thereon, when the pin 152 moves through the port 40. As noted above, the contacts of the switch S2 control the supply of power to the system.

The collar 253 is also adapted to engage a yoke 254. The yoke 254 is out of engagement with the collar 253 in the position of the parts shown in FIG. 11, assumed when the system is in its standby condition and no cassette is located in the pocket 2.

The yoke 254 is formed integral with a lever 255. The lever 255 is pivoted to a cam following lever 256 by means of a pivot pin 257 formed integral with the lever 256, and is detachably connected to the lever 256 by a second pin 258 that is at times removable by withdrawing it through an aperture 259 in the lever 255 in which it is shown in FIG. 11, to allow the lever 255 limited freedom of movement, independently of the lever 256.

The lever 256 is pivoted on the housing of a solenoid SL2. As more fully described in the above-cited copending U.S. application Ser. No. 227,080, when the solenoid SL2 is energized, the pin 258 is retracted to allow the lever 256 to be rotated by the cam 262 without moving the yoke 254 to retract the locator pin 159.

A cam follower 261 is formed at the end of the lever 256, and is adapted to engage a cam 262 fixed to the cam shaft 180. The follower 261 is resiliently urged into engagement with the cam 262 by a spring 263 having one end fixed in a suitable support 264 formed integral with the base plate 155.

Figure 13:
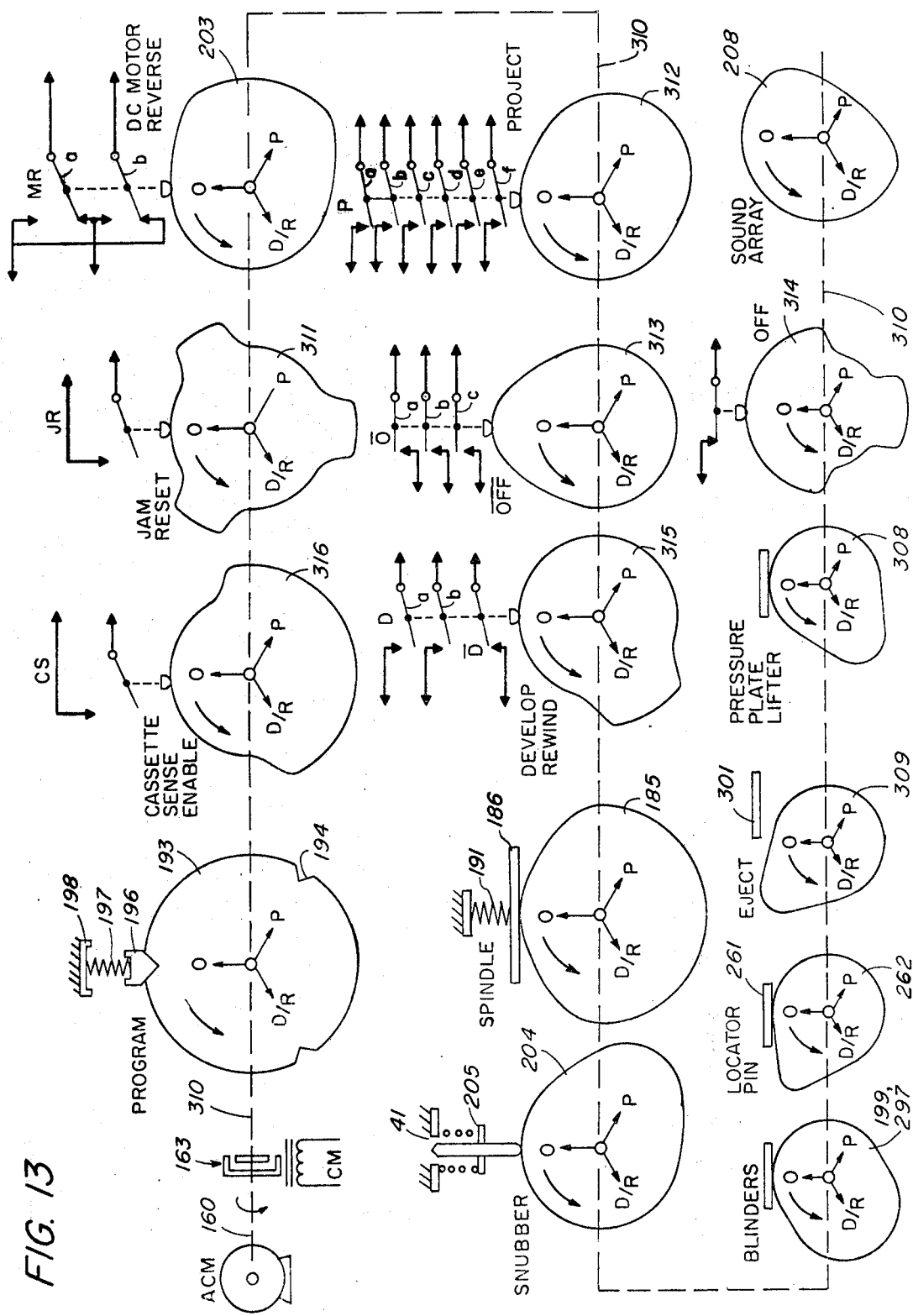
FIG. 13 is a schematic block and wiring diagram of a cam shaft and associated parts forming part of the apparatus of FIG. 7.

As best shown in FIG. 13, the cam 262 has three principal positions, 120 degrees apart in terms of the angle of the shaft 180, and labelled O, P and D/R. Mnemonically, these positions may be considered the OFF position, the PROJECT position, and the DEVELOP/REWIND position. They are sequentially assumed during operation of the apparatus, beginning with the location O in engagement with the cam follower 261, and then going sequentially to the positions P and D/R, and finally back to O, in the direction of the arrow shown in FIG. 13.

The relationship of these detented shaft angles to other functions performed in the apparatus will be described below. However, so far as the locating pin goes, the positions of the parts assumed when the point on the cam labelled O engages the cam follower 261 are shown in FIG. 11. That is the position assumed when no cassette is in the pocket 2, as described above. In that position, the cam 262 has moved the levers 255 and 256 to an idle position in which the yoke 254 is out of engagement with the collar 253 on the pin 159.

When a cassette is placed in the pocket 2, the floor pedal 42 is depressed and the yoke arms 244 move down out of engagement with the collar 250 on the pin 159, allowing the pin 159 to enter and protrude through the recess 40 in the plate 36. The contacts of the switch S2 are now closed by the collar 253, and the collar 253 moves into adjacent relationship to the yoke 254.

Referring to FIGS. 11 and 13, the cam 262 can rotate from the OFF position, and through the PROJECT and DEVELOP/REWIND positions, without effecting a displacement of the cam follower 261. However, as the cam 262 moves from the D/R position to the O position, the cam follower 261 will be actuated to rotate the lever 256 clockwise as seen in FIG. 11. Whether or not the locating pin 159 will be actuated by this movement, assuming that it has previously been released to protrude through the recess 40, will depend on whether or not the solenoid SL2 is energized. If it is energized, to retract the pin 258, the cam 256 will move independently of the cam 255, allowing the pin 159 to remain in the position engaging the cassette.

Assuming that the cam 256 has been rotated with the pin 258 retracted, the aperture 259 in the lever 256 that is adapted to receive the pin 258 is now moved out of position to engage the pin. As the cam 290 moves to the OFF position, the cam follower 261 will return to the position shown in FIG. 11. It will remain in that position as the cam 262 rotates through the O, P, and D/R positions. As the parts return to the position shown in FIG. 11, if the solenoid SL2 is deenergized, the pin 258 will reenter the aperture 259, again fixing the lever 255 to the lever 256.

If the solenoid SL2 is not energized as the cam 262 moves from the D/R position to the O position, the levers 255 and 256 will move together to retract the pin 159 by engagement of the yoke 254 with the collar 253, causing the pin 159 to be withdrawn and the switch S2 to open its contacts.

The construction of the sound array 13 will next be described with reference to FIGS. 4, 7 and 8. As shown in FIGS. 4 and 7, the array 13 comprises a rectangular frame 18. The sound recording, playback and erase head 16 is mounted on a front panel 268 formed integral with the frame 18. A pair of ears 269 are formed integral with the front panel 268 and extend outwardly to form bearings for an axle 270 on which the capstan 17 is fixed. The capstan 17 may be of polyurethane, rubber or other resilient friction material.

The axle 270 is fixed to the hub of a wheel 271 about the periphery of which a rubber tire 272, of rubber, polyurethane or the like is mounted. The tire 272 engages the output shaft 273 of a DC motor DCM2. The motor DCM2 is thus adapted to rotate its shaft 273 at high speed, whereby the disc 271 is driven through the tire 272, driving the shaft 270 and the capstan 17 at a lower speed appropriate for moving the film at approximately 3 inches per second. The motor DCM2 is mounted on a side plate 274 formed integral with the frame 18.

An I-beam generally designated 275 is welded to or otherwise formed integral with the base plate 155 as best shown in FIG. 4. The I-beam 275 has a central web 276 and end flanges 277 and 278. The flanges 277 slidably engages the side plate 274, and the flange 278 slidably engages a side plate 279 formed integral with the frame 18. A spring 280 extends between the web 276 of the I-beam 275 and the front panel 268.

The cam 208 mounted on the shaft 182 engages a back wall 281 formed integrally with the frame 18. The cam 208 is shown in FIG. 4 in the off position, or O position, in which the head 16 and capstan 17 are held out of engagement with the cassette 1. When the cam 208 is rotated to its P position, the head 16 and capstan 17 are allowed to move into the cassette to engage the film in the manner shown in FIG. 8. As shown, the head 16 urges the film 53 against the bumps 105 and 106 formed on the spring 102 to cause a partial wrapping of the film 53 around the head 16. The capstan 17 urges the film against the idler 58, driving the film in the direction shown by the arrow.

As will appear, operation of the apparatus will result in the formation of a loop 282 in the film as the film 53 leaves the capstan 17 and passes out of the cassette, and then back in over a guide ledge 283 formed on the bottom wall 45 of the cassette 1. A lamp, light-emitting diode, or the like, 284, is disposed in the production and editing apparatus adjacent the region in which the loop 282 is formed, and a photocell 285 is disposed in the housing mounted on the plate 155 adjacent the light source 284 so that the photocell will be illuminated by the light source except when the loop 282 protrudes from a cassette 1 in the pocket 2 and shields the photocell from the lamp. Resistance of the photocell 285 is sensed by circuit means to be described, to govern the length of the loop 282 so it maintains a constant average length. The purpose of the loop 282 is to isolate the intermittent motion of the film 53 as the film gate from the smooth and uniform motion desired past the sound head 16 and produced by the capstan 17.

Figure 14:
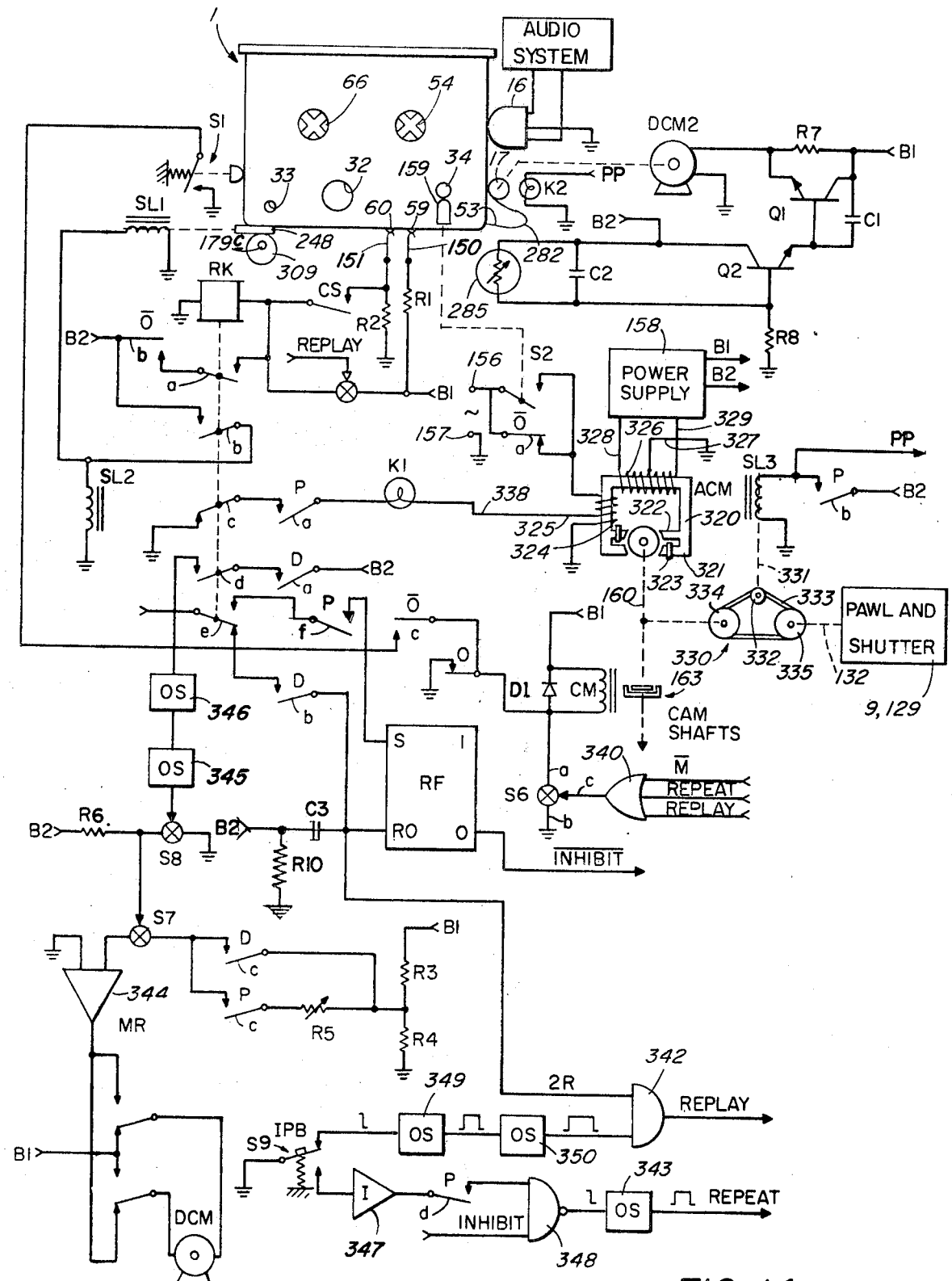
FIG. 14 is a schematic block and wiring diagram of control circuits forming a part of the apparatus of FIGS. 1 and 7.

Referring next to FIGS. 7, 13 and 14, the cassette ejecting mechanism comprises an eject enabling plate 248 slidably mounted in the floor 6 of the pocket 2. The plate 248 is hinged, as schematically indicated in FIG. 7, to a connecting plate 265 having an extension 286 that is connected to the armature 266 of the solenoid SL1. The assembly is urged into the position shown in FIG. 7 by a spring 267 extending between the end of a slot formed in the base plate 155 and the extending end 286 of the hinged eject enabling plate assembly.

The plates 248 and 265 are slidably mounted in a slot 287 formed in the base plate 155, and in the portion thereof comprising the floor plate 6 of the pocket 2, on ways schematically indicated at 288. The hinged end plate 248 is thus enabled to move from the position shown in 7, in which a cam admitting slot 289 in the floor plate 6 is covered, to the position shown, in which the end plate 248 exposes the slot 289.

An eject cam 309 is mounted on a shaft 179c (FIGS. 13 and 14), comprising one of those auxiliary shafts 179 rotatable with the shaft 180 and schematically indicated in FIG. 7. As more fully described in the above-cited U.S. application Ser. No. 227,080, the eject cam is adapted to move to a position protruding through the slot 289 in FIG. 7 between the D/R and O positions of the cam shaft. With the solenoid SL1 energized and the end plate 248 retracted from the position shown in FIG. 7, the cam 309 can enter the slot 289 and rotate through a full revolution without contacting the bottom of a cassette 1 inserted in the pocket. However, should the cam be rotated to its ejecting position when the solenoid SL1 is deenergized, the hinged end plate 248 will overlie the slot 289, such that when the cam 309 rises to the position in which it protrudes through the slot 289, the end plate 248 will be hinged up and eject the cassette 1.

The stop 192 mentioned briefly above in connection with FIG. 7 is adapted to be erected when the solenoid SL1 is energized, by means shown and described in the above-cited copending U.S. application Ser. No. 227,080. In the engerized condition of the solenoid SL1, the stop 192 rises into position to interfere with the spindle plate 186. In the deenergized condition of the solenoid SL1, the spindle shaft 186 can move back and forth between the position shown in FIG. 7, and a position which the sprockets 212 and 213 extend into the pocket 2, without interference by the stop 223.

The cams 185 in FIG. 7 are arranged to move the spindle plate 186 past the stop 192 before the solenoid SL1 is energized, allowing the plate 186 to pass over the stop 192 before it is erected, in the event that it is erected by energization of the solenoid SL1 in a manner to appear.

As indicated in FIG. 2, a binder housing 8 is mounted underneath the floor plate 6 of the pocket 2 beneath the aperture plate 7. As shown in FIG. 9, the housing 8 is provided with an aperture 290 sufficiently larger than the aperture 152 in the aperture plate 7 so that it will not limit the light transmitted through the film. A transverse slot 291 is formed in the block 8, to admit a blinder 292.

The blinder 292 is formed on one end of a bell crank generally designated 293. The bell crank 293 has another arm 294, and at the juncture of these arms a pivot pin 295, secured to a suitable mounting post formed integral with the floor plate 6, mounts the bell crank 293 for rotation in the housing for movement between the position shown in FIG. 9, in which the aperture 290 is exposed, and a position in which the aperture is closed.

The arm 294 carries a cam follower 296 that engages a cam 297. The cam 297 is mounted an a cam shaft 179a, comprising one of the auxilliary shafts 179 driven by the motor ACM through the clutch 163 synchronously with the shafts 180 and 182, as described above in connection with FIG. 7.

The cam follower 296 is urged into engagement with the cam 297 by a spring 298. The spring is mounted between a pair of pins 299 and 300, secured in turn to the floor plate 6 as suggested in FIG. 9.

The cam 297 is arranged to close the blinder 292 simultaneously with the closure of the blinder 200 for the lamp port 39, described above in connection with FIG. 7 and more fully described in the above-cited U.S. application Ser. No. 227,080. When both of these blinders are closed, and a cassette is inserted in the pocket 2, the portion of the film exposed in the film gate of the cassette is thus surrounded by a lighttight housing, in which the film may be processed by appropriate actuation of the supply and takeup reel described above. The ports 99 and 100 in the cassette 1 may be shielded by appropriate fixed opaque walls in the housing 3, not shown, surrounding the compartment in which the sound array 13 is movably mounted. As will appear, the light source 284 (FIG. 8) is not energized until after the film has been processed.

FIG. 12 shows the pressure plate lifting mechanism. As more fully described in U.S. application Ser. No. 227,080, the pressure plate 78 in a cassette 1 in the pocket 2 is at times raised to the position shown in FIG. 12 by a yoke generally designated 301, that comprises a pair of levers 302, only one of which is shown in FIG. 12. Each of the levers 302 has an outer pressure plate lifting arm 303 formed at one end and an inner pressure plate lifting arm 304 formed intermediate its ends.

Pivot pins 305 extending through the arm 302 and through a suitable support 306 formed integral with the floor plate 6 journal the lifter yoke 301 for rotation relative to the floor plate 6. The levers 302 are thus adapted to pivot between the position shown in FIG. 12, in which the arms 303 and 304 raise the pressure plate 78 out of engagement with the film 53 in a cassette 1 inserted in the housing and registering with the aperture plate 7, to a lowered position in which the pressure plate 78 engages the film 53. It should be noted that raising of the pressure plate 78 to the position shown in FIG. 12 interrupts the light seal previously at the film gate. However, the film in the cassette 1 remains protected against light at this time by the aperture plate 7, the walls of the pocket 2, and the end flange 35 on the cassette.

The arms 302 are joined by an integral plate 307 that serves as a cam follower, cooperating with a cam 308 that is fixed to a cam shaft 179b, comprising another of the auxiliary shafts 179 indicated schematically in FIG. 7, and rotating in unison with the main cam shaft 180 and its drive shaft 164. As indicated in FIG. 12, the cam 308 is arranged to raise the arm 302, lifting the pressure plate 78, in the D/R position of the cam shaft. The purpose is to eliminate unnecessary drag on the film 53 during processing, when the film is being drawn through the coating station, and during rewinding for storage, when a relatively high rewind speed and minimum friction are desirable.

Referring next to FIG. 13, there is shown the set of cams and cam actuated switches comprising the programming apparatus for the motion picture producing and sound editing system. For simplicity, the shaft driven by the electromagnetic clutch comprising the winding CM, shown in FIG. 7 as the shaft 164, the main cam shaft 180, and the auxiliary shafts schematically indicated at 179 and 182, are represented as a single shaft 310 arranged to be driven by the motor ACM from the shaft 160 when the clutch magnet CM is energized.

The various cams are shown schematically in FIG. 13 as disposed on the shafts 310 in their cooperative relationship, each cam being shown in the position corresponding to the OFF position and labelled O. As noted above, the cam shaft has three dwell positions 120 degrees apart, including the OFF position O, the PROJECT position P, and the DEVELOP/REWIND position D/R. Other functions are performed between these dwell positions, as will appear.

All of the cams are adapted to rotate in the direction of the arrows, when the shafts 310 are driven by the clutch 163. The registry of the cam shafts 310 at the dwell positions is insured by the detent 196 engaging one of the notches 194 in the program disc 193. In practice, the clutch magnet CM is energized until the cam shafts near this position, and system inertia carries the shafts and their associated cam followers into the detented dwell position under the influence of the detent 196.

The apparatus includes seven cam controlled switches. One of these is a cassette sensing switch CS controlled by a cam 316 that is open in the O position of the apparatus and closed from a position approaching the P position to a position after the D/R position. When this switch is closed, the terminals 59 and 60 on the cassette 1 (FIG. 4) are interrogated to determine whether or not the film in the cassette has been processed.

A jam reset switch JR, having a function to be described, is controlled by a cam 311. The switch JR is closed between each of the dwell positions O, P, and D/R, and opened at the dwell positions.

The DC motor reversing switch MR comprises two transfer contacts a and b that engage back contacts, as shown, in the OFF and D/R positions, and front contacts in the P position. Circuits controlled by these contacts cause the DC motor DCM1 to run, when energized, in a first direction in the P position, and in an opposite direction in the D/R position. Either position of the contacts could be assumed in the O position.

A PROJECT switch P comprises six contacts a, b, c, d, e and f, each closed in the P position of the apparatus by a cam 312, and open in other positions of the apparatus. Contacts of this switch close various circuits effective in the PROJECT mode of operation, as will appear.

An $\overline{OFF}$ switch labelled $\overline{O}$ is opened by a cam 313 in the OFF position, and closed in other positions of the apparatus. This switch has three contacts a, b and c, which control circuits to be described in positions other than the OFF position.

Another cam 314 closes a switch labelled O in all positions of the apparatus except the P and D/R dwell states. Closure of this switch is effective to maintain energization of the clutch magnet CM, as will appear, and signifies by its closed state that the apparatus is not in either of the PROJECT or D/R dwell positions.

A cam 315 controls two contacts labelled Da and Db, each closed in the D/R position of the apparatus. A contact labelled $\overline{D}$ is closed in all positions except the D/R position, and is open in that position, for purposes to appear.

The spindle cams 185, snubber cam 204, blinder cams 199 and 297, locator pin withdrawal cam 262, eject cam 309, sound array cam 208 and pressure plate lifter cam 308, all described above, are shown in FIG. 13 in their cooperative relation to the cam control switches and the program disc just described. The various states assumed as the cam shafts schematically indicated at 310 are rotated will be discussed below in more detail in connection with the operation of the system.

Referring next to FIG. 14, there is shown a schematic block and wiring diagram illustrating the cooperative relationship between a cassette 1 inserted in the pocket 2 (FIG. 1) and selected elements of the electromechanical control system therefor.

As briefly described above, the power supply 158 and the AC motor ACM are arranged to be energized over the AC line terminals 156 and 157 when the switch S2 is closed. The contacts of this switch are closed when the locator pin 159 is inserted into the port 34 of a cassette 1 inserted in the pocket 2 of the production and editing system. As indicated in FIG. 14, the switch S2 is paralleled by a contact $\overline{O}a$ that is closed except when the apparatus is in the OFF position by the cam 313 in FIG. 13. This switch contact, and others shown in FIGS. 13, 14 and 19, to be described, are shown in the OFF position.

The combined motor and transformer ACM comprises a conventional stator 320 having pairs of poles such as 321 and 322, one pole of each pair, such as 321, being provided with a conventional short-circuited shading coil 323. A primary winding 324 on the stator 320 supplies energizing current for the motor, and is tapped as indicated at 325 to provide a suitable source of voltage for energizing the lamp K1. The primary winding 324 also supplies energizing current for a secondary winding 326, having a center tap connected to ground as indicated at 327, and leads 328 and 329, balanced with respect to ground, connected to the input terminals of the DC power supply 158.

The power supply 158 may be any conventional means for converting alternating current to direct current. It serves to provide two regulated DC potentials B1 and B2 that are positive with respect to ground. For example, the voltages B1 and B2 may be 12 volts and 10 volts, respectively.

The drive shaft 160 of the AC motor ACM drives the clutch 163, engaged at times by the clutch magnet CM, referred to above. When the clutch magnet is energized, the input cam shaft 164 rotates to cause rotation of the other cam shafts described. The output shaft 160 of the motor ACM also drives the auxiliary shaft 132 connected through the crank 131 to the film advance pawl 129, when a clutch schematically indicated at 330 is energized. The shaft 132 also drives a conventional shutter 9, by conventional means not shown.

The clutch 330 is energized at times when a solenoid SL3 is energized. The armature 331 of the solenoid SL3 is connected to a pulley 332, such that when the solenoid SL3 is energized, a belt 333 is tightened to complete a drive connection between a pulley 334, driven by the shaft 160, and a pulley 335, connected to the shaft 132.

When a cassette 1 is inserted in the system, so that the locator pin 159 enters the port 34 in the cassette and closes the switch S2, the external terminals 59 and 60 on the cassette are conditioned for interrogation by a circuit which extends from the supply terminal at B1, through a first resistor R1, over terminals 150 and 151 which engage the terminals 59 and 60, and thence through a resistor R2 to ground.

The resistor R1 is selected to limit the current flowing through the contacts 150 and 151 and the terminals 59 and 60, when the latter are internally bridged as described above, while allowing the full supply voltage B1 to be used to interrogate the contacts. That is because the resistance presented by the terminals 59 and 60 may be initially relatively high, owing to dry contact resistances that exist as thin films across the contacts, and which are greatly reduced when current is established.

The resistor R2 is selected in value to establish a suitable control potential across it, when the terminals 59 and 60 are bridged within the cassette 1, to energize a relay RK. The relay RK is energized when the cassette terminals 59 and 60 are bridged, and the interrogation switch CS is closed. That establishes a pickup circuit for the relay RK.

Once energized, the relay RK completes a stick circuit including its own front contact $a$, and the contact $\overline{O}b$, closed except when the apparatus is in the OFF position. The stick circuit extends from the supply terminal at B2, a lower voltage than the voltage B1, over contact $\overline{O}b$, the front contact $a$ of the relay RK, and thence through the winding of the relay RK to ground.

The projection lamp K1 is at times energized over a lead 338 connected to the tap 325 on the primary winding 324. The circuit for the lamp extends from the lead 338 through the filament of the lamp K1, and thence over the contact $Pa$, closed when the apparatus is in its PROJECT state, and back contact $c$ of the relay RK, closed when the relay is deenergized, to ground.

The solenoid SL1, which actuates the cassette eject enabling plate 248 in FIG. 7 and also effects the positioning of the stop 223 for the spindle plate described above, and the solenoid SL2 which, when energized, disables the cassette locating pin withdrawal mechanism, are energized in parallel over a front contact $b$ of the relay RK, closed when it is energized. A circuit for the energization of the pawl and shutter drive control solenoid SL3 is completed when the contact $Pb$ is closed in the PROJECT state of the apparatus. Closure of the contact $Pb$ also produces an energizing current signal, labelled PP, to energize the lamp K2.

A diode D1 is connected in parallel with the clutch winding CM for the conventional purpose of protecting the winding against transients. An energizing circuit for the clutch magnet extends from the power supply terminal at +B1, through the winding of the clutch magnet, and thence over three selectively effective parallel paths. The first extends over contact $\overline{O}c$, closed except when the apparatus is in its OFF state, and thence over the contacts of the switch S1, closed except when a cassette 1 is inserted in the housing. This circuit serves to return the film drive and projection system to its OFF state when no cassette is present and the system is not in its OFF state. The power supply voltage is maintained under these conditions by contact $\overline{O}a$.

A second circuit for the clutch magnet CM is completed over the contact O, closed when the apparatus is in its OFF state. That circuit is effective to drive the apparatus through its OFF state only if the locator pin 159 has not been withdrawn as the apparatus nears its OFF state to open the power supply contacts S2. If that has occurred, both the power supply input switch S2 and the parallel contact $\overline{O}a$ will be opened, as the apparatus enters its OFF position.

The third circuit which at times energizes the clutch magnet CM extends from the lower terminal of the winding CM through the load terminals $a$ and $b$ of a convention electronic switch S6 to ground. The switch S6 may be any conventional device, such as a transistor or the like, which exhibits a low impedance between its load terminals when a control terminal $c$ is biased positive with respect to its load terminal $b$, and which exhibits a high impedance between its load terminals at other times.

The switch S6 is biased into conduction when the output terminal of a conventional OR gate 340 is at logic 1, or positive with respect to ground. That occurs when any of three input leads receives a logic 1 signal of the set $\overline{M}$, REPEAT and REPLAY.

Referring to FIG. 7, the signal $\overline{M}$ is produced at times by a motion detector 341. The motion detector 341 is fully described in the above-cited U.S. application Ser. No. 277,080. Briefly, it responds to produce a positive signal $\overline{M}$ when the shaft 223 ceases to move, and thus stops the motion of the ferromagnetic vanes 226 past the switch S5. When the shaft 223 is rotating in either direction, the switch S5 is repeatedly opened and closed, removing the signal $\overline{M}$.

Essentially, the switch S5 serves to discharge a capacitor when it is repeatedly opened and closed. When the switch S5 remains either open or closed for a predetermined time, the capacitor is charged to a voltage that causes the signal $\overline{M}$ to be produced. The contacts JR discharge the capacitor between the positions D/R, O and P of the cam shafts, thus resetting the motion detector.

By way of detailed comparison with the apparatus as described in application Ser. No. 227,080, the signal $\overline{M}$ would appear at the base of the transistor Q2 in FIG. 46 of that application.

At a dwell position such as P or D/R calling for the operation of the DC motor DCM1, once the motor is in operation to drive either the takeup or the supply reel, the switch contacts S5 will be repeatedly closed and opened, preventing signal $\overline{M}$ from appearing until motion of the film drive shaft has stopped. That will allow the apparatus to remain in its current dwell position until the film has been transported to the extreme position towards which it is being driven. Thereafter, the signal $\overline{M}$ will be produced again to allow the apparatus to be driven to its next dwell position.

Referring again to FIG. 14, the signal REPLAY is at times produced as a logic 1 signal at the output terminal of a conventional AND gate 342, in a manner to be described below. The signal REPEAT is at times produced as a positive pulse at the output terminal of a conventional one shot multivibrator 343, under conditions to be described below.

The signals REPEAT and REPLAY are used to cause the apparatus to interrupt the production of a sound motion picture when the apparatus is in the PROJECT state, to set the apparatus to the D/R state to rewind all or part of the film, and then to resume production for review of a portion of the recorded sound and picture sequence, or for sound editing, as will appear. The instant replay circuits do not, per se, comprise this invention, but are described and claimed in copending U.S. application Ser. No. 261,301, filed on June 9, 1972 by Edwin H. Land for Manually Controlled Replay System for Automatic Transparency Processing and Projection Apparatus, and assigned to the assignee of this application.

The motor control circuit for the film reel drive motor DCM1 comprises a drive current supply circuit for the winding of the motor that extends from the supply terminal at B1 over one of the motor reversing contacts MR selected by the position of the motor reverse control cam 203 in FIG. 13, through the winding of the motor, and thence over the other contact MR to the active output terminal of a conventional amplifier 344. When supplied with appropriate input signal, in a manner to be described, the amplifier 344 acts as an adjustable current sink that will cause the motor DCM1 to run in a direction selected by the position of the contacts MR.

In accordance with the illustrated embodiment of the invention, the motor DCM1 is required to run at a first speed for projection, and at a second and higher speed for rewinding and processing. A fast rewind signal is provided by a potentiometer comprising a resistor R3 connected in series with a resistor R4 between the supply terminal at B1 and ground. The junction of the resistors R3 and R4 is connected to the input terminal of the amplifier over a switch contact Dc, closed in the D/R state of the apparatus, and a conventional electronic switch S7, which is normally closed and is controlled in a manner to be described.

The circuit just described provides a relatively high current signal to the amplifier 344. A lower current signal, to cause the motor DCM1 to rotate more slowly for projection purposes, extends from the junction of the resistors R3 and R4 through a variable resistor R5, and thence over a contact Pc, closed when the apparatus is in its PROJECT state, and through the load terminals of the switch S7 to the active input terminal of the amplifier 344.

The control terminal of the switch S7 is normally biased into conduction by a circuit extending from supply terminal at B2 through a resistor R6 to the control terminal of the switch S7. The load terminals of a conventional electronic switch S8 are connected between the control terminal of the switch S7 and ground, so that when the switch S8 is closed, forward bias for the switch S7 is removed and the switch S7 is opened.

The control terminal of the switch S8 is connected to the output terminal of a conventional one shot multivibrator 345. The multivibrator 345 is arranged to be triggered by the rising trailing edge of a negative pulse produced by a conventional multivibrator 346. When triggered, the multivibrator 345 produces a positive output pulse for a predetermined time to cause the switch S8 to close and thus temporarily interrupt the signal to the amplifier 344.

The multivibrator 346 is triggered by a rising transition produced when the relay RK is energized and the apparatus goes to its D/R state. For that purpose, a trigger circuit for the multivibrator 346 extends from the supply terminal at B2 over contact Da, closed in the D/R state of the apparatus by the cam 315, and front contact d of the relay RK.

As more fully described in the above-cited U.S. application Ser. No. 227,080, when the apparatus goes to its D/R state and the film in the cassette 1 is unprocessd, so that the relay RK is energized, it is desired to start the motor DCM1, which causes the release of processing composition in the cassette 1, and then to wait for a brief interval to allow the composition to flow down into the coating nozzle 85 in FIG. 4 before resuming operation of the motor DCM1 to coat the film with processing composition. The pulse produced by the multivibrator 345 accomplishes this purpose after a delay introduced by the duration of the pulse from the multivibrator 346.

During the interval of the pulse produced by the multivibrator 346, the motor DCM1 will run to allow processing composition to be released in the cassette 1. Then, for the duration of the pulse from the multivibrator 345, the motor will stop to allow processing composition to come down into the nozzle. As will appear, the capstan drive motor DCM2 will be operated at this time, but the capstan 17 will not be in engagement with the film, so that this processing cycle will not be interferred with.

The control circuit for the capstan drive motor DCM2 will next be described. The motor DCM2 may be any conventional DC motor. It has an energizing circuit extending from the supply terminal at B1 over a first path through a resistor R7 and thence through the winding of the motor DCM2 to ground.

A second energizing circuit extends from the terminal at B1 from the collector to the emitter of a conventional *npn* transistor Q1, and thence through the windings of the motor DCM2 to ground. The base of the transistor Q1 is returned to the supply terminal at B1 through a capacitor C1. The base of the transistor Q1 is also connected to the emitter of a conventional *npn* transistor Q2.

The base of the transistor Q2 is returned to ground through a resistor R8. The base of the transistor Q2 is also connected, through the photocell 285, to the supply terminal at B2. A capacitor C2 is connected in parallel with the photocell 285. The collector of the transistor Q2 is connected to the supply terminal at B2, as shown.

In the operation of the motor control circuit, before the loop 282 is formed on the film, the photocell 285 will be fully illuminated by the lamp K2 and thus exhibit a minimum resistance. Accordingly, most of the supply voltage B2 will appear across the resistor R8, causing the transistor Q2 to be forward biased into saturation conduction. That will cause the transistor Q1 to be forward biased, and maximum current will flow to the motor DCM2.

The motor DCM2 will run rapidly, driving the capstan faster than the average speed at which film is advanced by the pawl 129 at the film gate. The result will be that the loop 282 will quickly form, extending from the cassette to interrupt the light path between the lamp K2 and the photocell 285.

The resistance of the photocell 285 will go up, thereby reducing the forward bias on the transistor Q2 and therefore tending to cut off the transistor Q1. When the transistor Q1 is cut off in this fashion, the only current flowing to the motor DCM2 will be that supplied through the resistor R7.

The resistor R7 is selected to make this minimum current inadequate to drive the capstan 17 as fast as the film is advanced by the pawl 129. The loop 282 will accordingly be adjusted in average size to a fixed average length with the capstan 17 running at the average speed at which the film is advanced by the pawl 129.

The minimum speed of the motor DCM2, selected by the resistor R7, is chosen to produce a film speed close to the lowest speed produced by the drive pawl. That allows the motor DCM2 to reach a speed high enough to form the loop 282 even though the motor has a relatively slow response within its control band.

Since the pawl operates at typically eighteen cycles per second, the resistance of the photocell 285 will fluctuate at essentially that frequency. The capacitor C2 provides filtering to average out the control signal supplied to the transistor Q2, with a first fluctuating time constant determined by the instantaneous resistance of the photocell 285, the capacitance of the capacitor C2 and the resistance of the resistor R8. The capacitor C1 provides additional filtering, with a second time constant determined primarily by the capacitance of the capacitor C1, the base resistance of the transistor Q1, and the output impedance of the first stage comprising the transistor Q2. This time constant is preferably substantially greater than the maximum value of the first time constant.

It is desired to make this filtering sufficient that the motor DCM2 will have a relatively slow response, below the range of wow and flutter that would be troublesome. For that purpose, typical values of the critical components are 6.9ohms for the resistor R7, 220 microfarads for the capacitor C1, 520,000 ohms for the resistor R8, and 1.33 microfarads for the capacitor C2. These values assume a voltage B1 of 12 volts and a voltage B2 of 10 volts.

The value of the resistor R8 essentially selects the sensitivity of the photocell. The photocell will typically fluctuate in resistance from a value on the order of megohms, when it is dark, to a value on the order of 100 ohms, when it is fully illuminated. The mass of the disc 271 with its tire 272, in FIG. 7, for example, serves as a flywheel to further integrate the capstan speed.

It has been found that the flutter at 18 cycles per second can be reduced to 0.1%, with a switching voltage amplitude at the winding of the motor DCM2 of 0.12 volts. It will be noted that neither the motor ACM or the motor DCM2 is regulated to constant speed, but that the resulting speeds are essentially constant for all practical purposes. It is highly undesirable to regulate the speed of the motor ACM, because that would regulate the voltage applied to the lamp K1.

As shown in FIG. 14, the replay button IPB controls a switch S9. The switch S9 comprises a manually operated, spring-returned pushbutton having an armature connected to ground. When the pushbutton IPB is momentarily depressed, it provides a ground-going transition that is inverted by a conventional inverting amplifier 347.

In the PROJECT state of the apparatus, when a contact Pd is closed, the signal at the output of the inverter 347 is applied to one input terminal of a conventional NAND gate 348. A second input terminal of the gate 348 receives a level $\overline{\text{INHIBIT}}$ that is at logic 1 when a flip flop RF is reset. When the contact Pd is closed, the level $\overline{\text{INHIBIT}}$ is present, and the pushbutton IPB is momentarily depressed, the gate 348 produces a ground-going transition that triggers the one-shot multivibrator 343, described above, to produce the positive pulse labeled REPEAT.

When the pushbutton IPB is depressed and then released, a ground-going transition is supplied to trigger a conventional one-shot multivibrator 349 to produce a positive pulse having a predetermined duration adequate to insure at least a minimum interval of rewinding before projection is resumed. The trailing edge of the pulse produced by the multivibrator 349 triggers a conventional multivibrator 350 to produce a positive output pulse that is applied to one input terminal of the two-input terminal AND gate 342 described above.

The gate 342 also receives a signal labeled 2R that is present at logic 1 when contact Db is closed in the D/R state of the apparatus, and when the relay RK is released to close its back contact e. Under these conditions, a circuit extends from the supply terminal at B2 over back contact e of the relay RK, over the front contact Db controlled by the cam 315 in FIG. 13, to the reset input terminal of the flip flop RF, and to the second input terminal of the gate 342. When this signal 2R is present and the one-shot multivibrator 350 is triggered, the gate 342 produces the pulse labeled REPLAY, as described above.

The flip flop RF may be of any conventional design, arranged to be reset by a positive pulse applied to its reset terminal R, and to be set by a positive level applied to its input terminal S. The flip flop RF is also reset by a pulse supplied through a capacitor C3 from the supply terminal at B2 when a cassette is first inserted in the pocket 2 and the power supply is energized. The capacitor C3 is discharged through a resistor R10 when the power supply is deenergized.

The flip flop RF is set when the relay RK is energized and the apparatus is in its PROJECT state by a circuit extending from the supply terminal at B2 over front contact e of the relay RK, contact Pf, and thence to the set terminal of the flip flop. When reset, a positive signal labeled $\overline{\text{INHIBIT}}$ is present at the logic 0 output terminal of the flip flop RF.

The purpose of the flip flop RF is to inhibit the use of the replay pushbutton IPB during the first projection cycle after film has been processed. This first projection cycle is desirably carried through without interruption so that the film is uniformly dried after it is processed.

Referring next to FIGS. 15, 16, 17 and 18, the mechanical details of the operator's control unit 19 will next be described. As shown, the unit 19 comprises a housing 23 in which the microphone 22 is mounted. A front panel 354 is removably secured to the housing 23 by means shown as four machine screws 355.

The replay pushbutton IPB extends through a suitable aperture in the plate 354. Similarly, the recording control pushbutton RPB is mounted over the panel 354 and is adapted to be moved in an arcuate slot 356 formed in the panel 354. As best shown in FIG. 17, the pushbutton IPB extends into a well 357 formed integral with the cover panel 354 and terminating in a ledge 358 that supports a spring 359 that urges the pushbutton IPB upwardly as seen in FIG. 17.

A shaft 360 is formed integral with the pushbutton IPB. The shaft 360 is pivotally secured to two links 361 and 362 by means shown as a pivot pin 363. The link 361 is pivoted at its other end to a fixed support 364 formed integrally with the housing 23. The link 362 is pivoted at its other end to a wedge 365, by means shown as a pivot pin 366. When fully depressed, the pushbutton IPB actuates the spring return micro-switch S9 described above in connection with FIG. 14.

As best shown in FIGS. 16 and 18, the record control button RPB is formed integral with a shaft 367 on which a collar 368 is formed. The shaft 367 is threaded into engagement with cooperating threads formed in a post 369 having a collar 370 adapted to confront the collar 368 to form a sliding attachment to the cover panel 354 for movement of the pushbutton RPB in the slot 356. A reduced portion 371 formed on the post 369 is adapted to slidingly receive a spring 372. As shown in FIG. 16, the spring 372 is fixed in a well in the housing 23 below the cover panel 354 by means shown as a pair of posts 373 and 374. These posts, and the support 364, are located in a recess 375 formed in the housing 23, and provided with posts such as 376 at the corners that are drilled and tapped to receive the screws 355.

A microswitch S10 is adapted to be actuated by the pushbutton RPB when it is moved all the way to the top right-hand corner of the slot 356 as seen in FIG. 15. For this purpose, the switch S10 is provided with an actuating lever 377 that is adapted to be engaged by the post 369 on the pushbutton RPB in the upper right-hand position of the pushbutton RPB in FIG. 15. In that position, a slight downward curve of the slot 356 allows the pushbutton RPB to be retained by pressure of the spring 372 when the pushbutton is released by the operator. In that position, the microswitch S10 is actuated, for purposes to be described below in connection with FIG. 19.

The pushbutton RPB can be returned to the LISTEN position, either by movement by the operator against the force of the spring 372 to bring the pushbutton back to the region of the arc in which it will be driven down to the position shown in FIG. 15 by the spring, or by actuation of the pushbutton IPB. When the pushbutton IPB is depressed, if the pushbutton RPB is in the upper right-hand corner of the slot 356, the wedge 365 will move it out to the region in which it will be driven down to the LISTEN position by the spring 372. This interlocking feature prevents actuation of the microswitch S9 to initiate a rewind and reprojection operation while the pushbutton RPB is in the RECORD position. The purpose of this feature is to prevent the user from inadvertently erasing previously recorded material on the film 53 when the apparatus returns to the PROJECT state after the pushbutton IPB has been released.

Figure 19:
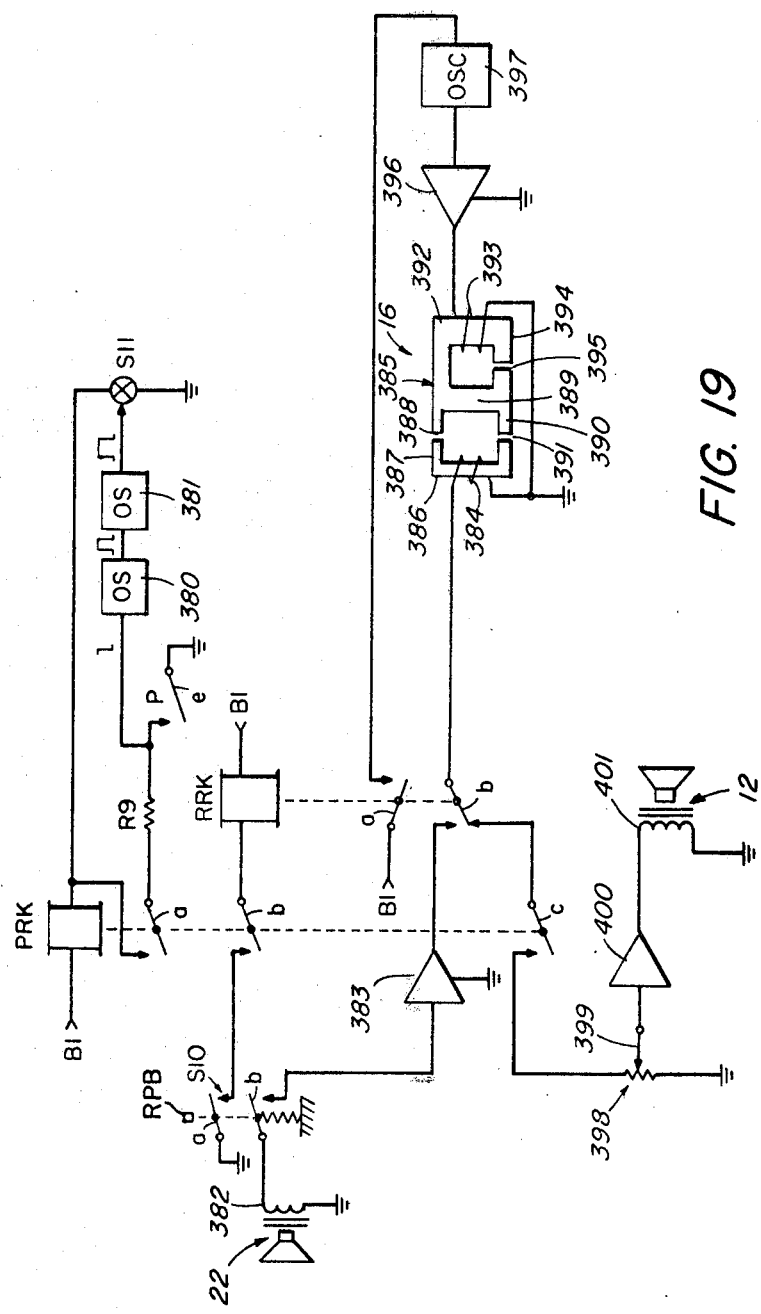
FIG. 19 is a schematic wiring diagram of sound recording, erasing and reproducing apparatus forming a part of the producing and editing system of FIG. 1.

Referring next to FIG. 19, the audio system for the motion picture production and sound editing system of the invention will next be described.

It is desired to inhibit recording and erasing except during the PROJECT state of the apparatus. It is also desirable to inhibit recording or erasing during the formation of a loop 282 in the manner described above in connection with FIG. 14. A relay PRK is provided to insure that these conditions are met.

An energizing circuit for the relay PRK extends from the supply terminal at B1 through the winding of the relay, and thence through the load terminals of a conventional electronic switch S11 to ground. The switch S11 is closed for an interval sufficient to pick up the relay PRK when the apparatus goes to the PROJECT cycle after a delay sufficient to permit formation of the film loop and establish synchronization of the sound and picture.

A contact Pe is closed when the apparatus goes to the PROJECT cycle. That applies a ground-going transition to a conventional one-shot multivibrator 380. The multivibrator 380 is designed to produce a pulse having a duration sufficient to insure that the film loop is formed and stabilized. At the trailing edge of the pulse produced by the multivibrator 380, a second multivibrator 381 is triggered to produce an output pulse having a duration sufficient to close the switch S11 long enough to pick up the relay PRK.

Once picked up, the relay PRK completes a stick circuit over its own front contact a, through a current limiting resistor R9, and thence over the project contact Pe to ground. The relay PRK will thus remain energized as long as the apparatus is in the PROJECT cycle, and will drop out as soon as the apparatus goes toward the D/R state from the PROJECT state.

A recording relay RRK is adapted to be picked up any time after the relay PRK is picked up. For this purpose, an energizing circuit for the relay RRK extends from the supply terminal at B1 through the winding of the relay RRK, over front contact b of the relay PRK, and thence to a normally open contact a of the switch S10 controlled by the record pushbutton RPB. As the pushbutton RPB is moved to the RECORD position when the relay PRK is energized, the relay RRK will be energized and remain energized until either the apparatus goes out of the PROJECT cycle or the pushbutton RPB is moved out of the RECORD position, either by the user's direct action, or because the pushbutton IPB has been depressed.

The microphone 22 has a winding 382 connected between ground and the armature of a normally open contact b of the switch S10. When this contact b is closed, by movement of the pushbutton RPB to the RECORD position, the microphone output coil 382 is connected to the active input terminal of a conventional audio amplifier 383. At times when the amplifier 383 is effective to record, the relay RRK will be energized, closing a circuit over its front contact b between the active output terminal of the amplifier 383 and a record and playback winding 384 forming part of the head 16.

As schematically illustrated, the head 16 is preferably of the type which combines the functions of recording, playback and erasing. For that purpose, the head 16 comprises a ferromagnetic core generally designated 385 formed with a first magnetic path including a leg 386 on which the winding 384 is wound, a leg 387 interrupted by a back gap 388, a central leg 389, and a return leg 390 interrupted by a record and playback gap 391. A second magnetic path includes the center post 389, a path through a leg 392 on which an erase winding 393 is disposed, and a return leg 394 interrupted by an erase gap 395.

The erase winding 393 is adapted to be energized by an amplifier 396 in response to the output signal from a high frequency oscillator 397, oscillating at a frequency such as 60KHz when supplied with an energizing signal over front contact *a* of the relay RRK. The core 385 and windings 384 and 393 are preferably designed so that when erase current is supplied to the gap 395 by the winding 393, sufficient flux at the high frequency of the erase current is coupled into the record gap 391 so that a conventional high frequency bias signal is added to the audio signal from the amplifier 383.

When the relay PRK is energized, and the relay RRK is deenergized, the winding 384 serves as a playback winding and supplies an audio signal over back contact *b* of the relay RRK, front contact *c* of the relay PRK, and through a volume control potentiometer 398 to ground. The potentiometer 398 is provided with a wiper 399 actuated by the volume control knob 26 in FIG. 1. The wiper 399 is connected to the active input terminal of a conventional audio output amplifier 400, which supplies energizing current to the winding 401 of the speaker 12 in FIG. 2.

It will be apparent that by the arrangement just described it is possible to listen to sound recorded on a film 53 at any time during the PROJECT cycle after the film loop has been formed. When the listener decides to edit or add to the sound recorded on the film, when the switch RPB is moved to the RECORD position, the apparatus immediately goes to the RECORD state with the energization of the relay RRK, interrupting the playback circuits and establishing the recording circuits so that recording can be begun immediately after the point when the listener decides to interrupt. The use of this facility together with the instant replay button IPB enables the user to repeatedly review a scene and edit the accompanying sound track until it is as desired.

Having thus described the system of the invention, its operation will next be described. Referring to FIG. 4, it will be assumed that a cassette of film has been exposed in a camera, such that it is disposed primarily on the takeup reel 64 and located at the exposure termination point established by the first elongated sprocket hole 118 in FIG. 5.

The parts of the apparatus will be in the position illustrated in FIG. 4, with the terminals 59 and 60 presenting a closed circuit because they are bridged by the cam and valve member 88. The production and editing system will be in the condition shown in FIG. 7, with the reel drive sprockets 212 and 213 retracted, and the apparatus deenergized because the contacts of the locator pin actuator switch S2 are open. The locator pin 159 will be in its retracted position. The cam shafts 179, 180 and 182 will be in the O position.

Referring to FIG. 14, the contact O will be closed, preparing a circuit for the clutch magnet CM. However, the clutch magnet will not be energized, because the power supply contacts S2 and $\overline{O}a$ are both open. The switch S1 will be closed.

Next, assume that a cassette 1 in the state described is inserted into the pocket 2. The first effects will be to depress the foot pedal 42, open the switch S1, and register the terminals 59 and 60 on the cassette 1 with the contacts 150 and 151 located on the wall 149 of the pocket 2 (FIG. 7).

Referring to FIGS. 10 and 11, when the foot pedal 42 is depressed, the yoke arms 244 will be removed from the collar 250 on the locating pin 159, allowing the locating pin to be driven by the spring 251 into the position in which it protrudes through the port 40 in the wall 36. The pin 159 will enter the port 34 in the cassette, latching the cassette in the pocket. That locates the cassette and prevents premature removal of the cassette with the film partially processed, or in a random position. At the same time, the switch S2 closes its contacts.

Referring to FIG. 14, with the switch S2 closed, its contacts supply power to the combined motor and transformer ACM, causing the shaft 160 to rotate and drive the blower fan 161 (FIG. 7). At the same time, the power supply 158 will be energized.

The power supply voltages B1 and B2 will now appear, causing the clutch magnet CM in FIG. 14 to be energized over the closed contact O. The flip flop RF will be reset by a pulse through the capacitor C3. The capstan drive motor ACM2 will operate at its lowest speed, in the absence of light from the lamp K2, but the capstan 17 and head 111 will not yet engage the film 53.

The cam shaft 164 will now be driven, causing the cam shafts 179, 180 and 182 to be driven. Referring to FIGS. 7 and 13, rotation of the shaft 180 will cause the cams 185 to begin to rotate from their O position toward their P position. The spindle plate 186 will pass over the stop 192 in its lower position. When the plate 186 has passed over the stop 192, the cam 316 will close the cassette sense enable switch CS, as shown in FIG. 13, preparing the cassette sense enabling circuit for the energizing of the relay RK as seen in FIG. 14. Since the terminals 59 and 60 on the cassette 1 are bridged at this time by the valve 88, within the cassette, the relay RK will be energized, and close its stick circuit over its own front contact *a* and the contact $\overline{O}b$, which is now closed because the cam 313 in FIG. 13 has moved away from the O position toward the P position.

The solenoids SL1 and SL2 will now be energized. Referring to FIG. 7, energizing the solenoid SL1 will cause the hinged end plate 248 of the cassette eject enabling assembly to be moved back away from the slot 289, to prevent premature ejection of the cassette 1 by the cam 309. At the same time, the stop 192 is moved into position to prevent movement of the spindle plate 186 back out of engagement, in the manner described in detail in the above-cited U.S. application Ser. No. 227,080.

Referring to FIG. 11, energization of the solenoid SL2 will retract the latching pin 258 from the lever 255 to disable the locator pin withdrawal assembly. As shown in FIG. 13, the cam 262 will not effect any movement of the cam follower 261 during this rotation from the position O to the position P.

As the spindle plate 186 completes its movement toward the wall 36 in FIG. 7, the drive sprockets 212 and 213 will engage the corresponding takeup reel drive sprocket and supply reel drive sprocket 66 and 54 of the cassette (FIG. 4). This connection is established just before the raising of the stop 192 as described above, so that engagement of the drive sprockets will be maintained by the stop 192 during the sequence of operations to follow regardless of the positions of the cams 185.

Referring to FIGS. 7 and 13, as the cam shaft reaches the P position, the snubber stop cam 204 will drive the snubber stop 205 into engagement with the snubber hub 82 of the snubber roll 63, as seen in FIG. 4. At the same time, the sound array control cam 208 will allow the sound array 13 to move into engagement with the cassette, so that the capstan 17 and head 16 go into the operative positions shown in FIG. 8.

Referring to FIG. 14, with the apparatus in its P position, the contact Pb will be closed, causing the solenoid SL3 to be energized and engaging the pulleys 332 and 334 with the belt 333 to drive the film advance pawl 129 and to operate the shutter 9. The contact Pf will be closed, and with the relay RK energized and its front contact e closed, the flip flop RF will be set to remove the level $\overline{\text{INHIBIT}}$. Thus, the pushbutton IPB will be disabled. The projection lamp K1 will not be energized at this time, because its energizing circuit is open at the open back contact c of the relay RK.

When the contact Pb closes, the lamp K2 will be energized. The motor DCM2 will then begin to move more rapidly. The loop 282 will quickly form, despite the relatively slow response of the transistor Q1, because the lowest speed of the motor DCM2 is near the speed at which a loop will form.

Referring to FIGS. 13 and 14, the motor reverse contacts MR will be moved by the cam 203 into their upper position, causing the motor DCM1 to drive the film takeup reel through the shaft 227, the gears 228 and 231, the shaft 229, the clutch 233, the clutch 225, the shaft 223, and the drive sprocket 213 in FIG. 7.

The control circuit for the motor DCM1 will extend from the supply terminal at B1 in FIG. 14 through the resistor R3, variable resistor R5, contact Pc, and the load terminals of the closed switch S7 to the active input terminal of the amplifier 344. That will cause the motor DCM3 to run at a speed slightly greater than the average rate of film advance by the pawl 129.

The film will now be advanced from the termination point established by the sprocket hole 118 in FIG. 5 to the point established by the second elongated sprocket hole 119 in FIG. 5. Referring to FIG. 6, when that point is reached, the pawl teeth 127 and 128 will skip through the elongated sprocket hole 119 without engagement with the film, and the takeup reel will stop.

At some point just after the elongated sprocket hole 119 is reached by the pawl 129, the end of the film on the takeup reel will be reached with the capstan 17 located over the capstan wear pad 125 on the film 53. The capstan will continue to rotate on the wear pad for a short time, without further extending the loop 282.

During the advance movment of the film onto the takeup reel just described, the bump 121 on the film 53 will engage the end of the pressure pad 86, moving the pressure pad into coating relation with the nozzle 85 as described above. During the same interval, referring to FIG. 7, the contacts of the switch S5 repeatedly close and open to prevent the motion detector 341 from producing the signal $\overline{\text{M}}$.

During this first advance movement of the film, although the sound system is operative, no sound will normally be heard, even though sound may have been recorded on the film in the camera. The reason is that sound would not normally be recorded beyond the recording point corresponding to the exposure endpoint on the film established by the elongated sprocket hole 118.

When the elongated sprocket hole 119 on the film is encountered, the shaft 223 in Figure will stop, because frictional engagement of the film with the snubber roll is no longer relieved by the drive pawl, and the shaft 223 will be unable to drive the takeup reel against this load. Accordingly, the switch S5 will cease to be opened and closed. Referring to FIG. 7, that will cause the motion detector to produce the signal $\overline{\text{M}}$, after a time delay incorporated to prevent false operation in the manner described in detail in the above-cited U.S. application Ser. No. 227,080.

When the signal $\overline{\text{M}}$ is produced, the clutch magnet CM will be energized. The signal $\overline{\text{M}}$ applied to the gate 340 will cause the switch S6 to be closed for this purpose, as seen in FIG. 14. The shaft 164 and its associated cam shafts will be driven to the next dwell position. Referring to FIG. 13, the cams will now begin to move from the P position towards the D/R position.

Referring to FIGS. 13 and 14, as the cams move away from their P position, the p contacts will open and the solenoid SL3 will be deenergized. That will disengage the shaft 160 from the shaft 132, and the pawl and shutter will cease to operate.

The cam 314 will close the OFF contact O between the P and D/R positions. The contact O will maintain a circuit for the clutch magnet CM until the apparatus nears its D/R position.

As shown in FIG. 13, the reset contact JR will be closed between the P and D/R positions. The contact JR will reset the motion detector 341 for the next cycle of operation, removing the signal $\overline{\text{M}}$.

Referring again to FIG. 13, the motor reversing contact MR will now be changed to the other position, preparing the film reel drive motor DCM1 to be driven towards the supply reel. As the cams move away from the P position, the snubber stop 205 will be retracted. The cam 208 will move the sound array 13 out of engagement with the film, with the motor DCM2 continuing to operate.

The blinder cams 199 and 297 will move the associated lamp and aperture plate blinders towards their positions closing the light apertures in the pocket 2, so that the film in the cassette will now be in a lighttight environment. The pressure plate cam 308 will be operated to raise the pressure plate, by the mechanism shown in FIG. 12.

Referring to FIG. 14, when the apparatus reaches its D position, contact Dc will be closed, and the motor DCM1 will begin to operate in response to the high speed signal supplied from the junction of the resistors R3 and R4. The multivibrator 346 will be triggered by the closing of the contact Da with the front contact d of the relay RK closed.

Referring to FIG. 7, the motor DCM1 will now drive the supply reel shaft through the shafts 227 and 230, the clutches 234 and 224, and the shaft 219 and sprocket 212. The film will begin to advance onto the supply reel. The first result will be to pull out the loop 282 formed during the previous PROJECT cycle. Next, the takeup reel will begin to rotate, thereby driving the shaft 223 through the sprocket 213. That will cause the switch S5 to open and close, as before.

For the interval during which the multivibrator 346 (FIG. 14) produces its output pulse, the motor DCM1 will continue to drive, advancing film onto the supply reel and causing the tear-tab release mechanism described above in connection with FIG. 4 to be actuated to strip the tear-tab in part from the initially sealed receptacle of processing fluid.

At the end of the pulse produced by the multivibrator 346, the multivibrator 345 will be triggered to close the switch S8, thus opening the switch S7, to stop the motor DCM1 for an interval sufficient to allow processing composition to flow into the nozzles 85. During that interval, the switch S5 will not function. However, as described in the above-cited U.S. application Ser. No. 227,080, a minimum delay greater than the duration of the pulse from the multivibrator 345 is preferably provided before the motion detector 341 will respond to produce the signal $\overline{M}$.

At the end of the pulse produced by the multivibrator 345, the motor DCM1 will begin to turn again at the speed established by the signal supplied from the junction of the resistors R3 and R4. Processing of the film will occur as described above. The switch S5 in FIG. 7 will now function normally, preventing the production of the signal $\overline{M}$.

When the end of the film is reached, the takeup reel will stop rotating, and the shaft 223 in FIG. 7 will accordingly stop. That will stop the rotation of the vanes 257, and the switch S5 will no longer be opened and closed. The signal $\overline{M}$ will again be produced, preferably in the manner described in the above-cited U.S. application Ser. No. 227,080, after a time delay sufficient to allow uniform development of the film.

When the signal $\overline{M}$ is produced, the clutch magnet CM in FIG. 14 will be energized to drive the cam shafts from their D/R positions toward their O positions. Referring to FIGS. 13 and 14, the contact O will be reengaged, to keep the clutch magnet energized during the shaft movement to the O position.

The pressure plate lifter cam 308 will move into a position in which the pressure plate in the cassette is again lowered into engagement with the film. The blinder cams 199 and 207 will be actuated to open the light ports into the pocket 2.

The spindle cams 185 will begin to move back from the spindle plate 186 in FIG. 7. When that occurs, with the stop 192 in its raised position as described above, the stop 192 will be held frictionally in position, preventing the spindle plate 186 from being retracted as the cams 185 are retracted.

During most of the motion of the cam shaft from its D/R position to its O position, the contacts $\overline{O}$ remain closed by the cam 313 in FIG. 13. That maintains the relay RK in FIG. 14 energized, and keeps the solenoids S11 and S12 energized.

When the cam shaft reaches its O position, the contacts $\overline{O}$ will be opened, and the relay RK will be released. That will cause the solenoids SL1 and SL2 to be deenergized. The hinged plate 248 will move back over the slot 289, as it can do with the cam 309 in the neighborhood of its O position, so that the cam 309 will be enabled to eject the cassette as it next approaches its O position.

Referring to FIG. 11, when the solenoid SL2 is deenergized, the pin 258 will extend into the link 255, enabling the locating pin withdrawing mechanism. Between the positions D/R and O, the jam reset contact JR will be closed, causing the motion detector 341 to be reset as described above.

When the apparatus reaches its O position, the clutch magnet CM will remain energized over contact O (FIG. 14). Accordingly, the cam shaft will continue to rotate to carry the apparatus to its P position. As it does so, the spindle cams 185 will again engage the spindle plate 186 in FIG. 7, and that action will relax the frictional engagement between the stop 192 and the spindle plate 186 and allow the stop 192 to fall below the plate 186.

At this point, the apparatus is in the condition that it would be in had a cassette of previously processed film been inserted in the pocket 2. Accordingly, the following description applies both to the sequence of operations that occur when a cassette of unprocessed film is inserted, after it has been processed, and to the insertion of a cassette of processed film.

As the apparatus reaches its P position, with the relay RK in FIG. 14 deenergized, contact Pa will be closed to energize the projection lamp K1. Contact Pb will be closed to energize the lamp K2 and the solenoid SL3 causing the film drive pawl 129 to be actuated and the shutter 9 to be opened and closed synchronously therewith. Contact Pa will be closed, triggering the multivibrator 380 in FIG. 19 to begin the time delay for enabling the loop 282 to form before the record button RPB is enabled.

The cam 204 and 208 will move the snubber stop 205 and the sound array 13 into operating position as described above. The loop 282 will form rapidly, and then stabilize, under the control of the photocell 285.

Referring to FIG. 14, the film reel drive motor control circuit will now supply a signal through the resistor R5 to cause the motor DCM1 to drive the takeup reel slowly in the direction to advance film ono the takeup reel. The signal will be supplied over closed contact Pc and the closed switch S7.

The processed images on the film 26 will now be projected on the screen 5 as seen in FIG. 1, synchronously with the reproduction of any signal that may have been recorded on the sound tack 123 (FIG. 5). For 8 mm film having approximately 50 feet of processed images, that operation may occupy, for example, approximately three minutes and 20 seconds.

After the initial delay to enable film loop formation, the relay PRK in FIG. 19 will pick up. That will enable the recording of sound by means of the microphone 22 under the control of the pushbutton RPB. However, the pushbutton IPB will be disabled during this first projection cycle by the absence of the signal $\overline{\text{INHIBIT}}$.

The projection and sound reproducing cycle will continue until the second elongated sprocket hole 119 on the film 53 is reached, whereupon the takeup spool drive shaft 223 in FIG. 7 will stop. The motion detector 341 will now function to produce the signal $\overline{M}$, so that the clutch magnet CM will again be energized, driving the apparatus towards its D/R position. The snubber stop 205 and the sound array 13 will be retracted as described above. The binders for the light apertures in the pocket 2 will again be closed, but that operation will not be significant because the film has already been processed.

When the apparatus reaches its D/R position, the closure of contact Db in FIG. 14, with the relay RK deenergized and its back contact e closed, will reset the flip-flop RF to produce the signal $\overline{\text{INHIBIT}}$. Closure of the contact Dc will cause the motor DCM1 to rewind the film rapidly onto the supply reel. That operation may occupy, for example, about 10 seconds. At the end of rewind, the motion detector 341 will again respond, to reenergize the clutch magnet CM and drive the apparatus back towards its O position.

Referring to FIG. 11, the pivot pin 258 has been reengaged with the lever 255. Accordingly, as the apparatus nears its O position, the locator pin 159 will be withdrawn to the position shown in FIG. 11.

Prior to the withdrawal of the locator pin, the cams 185 in FIG. 7 allow the spindle plate 186 to be moved back away from the wall 36, withdrawing the drive sprockets 212 and 213 from the cassette. Following the withdrawal of the locator pin, the ejector cam 309 will rise into the slot 289 in FIG. 7, ejecting the cassette 1 through the intermediate plate 248 to a position raised slightly out of the pocket 2 in the housing 3, where it can conveniently be grasped for withdrawal by the operator.

When the locator pin is withdrawn, the contacts of the switch S2 are opened. Referring to FIG. 14, that action does not immediately disable the power supply, because the contact Oa remains closed until the apparatus reaches its OFF position. When it does reach that position, the contact Oa opens, restoring the apparatus to its initial condition in which it is in readiness for the insertion of another cassette.

It will be apparent that had a cassette containing previously processed film been inserted in the pocket 2, the terminal 59 and 60 would not initially be bridged. Accordingly, the relay RK would not be picked up. The flip-flop RF will be set through the capacitor C3 when the supply voltage B2 first appears, and will remain reset. The apparatus would then move from its O position to its P position in the manner described above, following the processing of unprocessed film.

After the relay PRK in FIG. 19 has been picked up following the delay to allow loop formation in the manner described above, the apparatus is operative to permit sound recording and editing by the use of the replay button IPB. Suppose that no sound has previously been recorded on the film strip, and it is desired to record sound at the beginning of the picture sequence after the film has been processed.

Substantially as soon as the cassette has been inserted and the apparatus has reached its PROJECT state, the instant replay button IPB can be depressed, causing the REPEAT signal to be produced by means of the apparatus shown in FIG. 14. That will close the switch S6 through the BR gate 340, causing the clutch magnet CM to be energized and operating the apparatus from its PROJECT state to its D/R state.

If the pushbutton IPB is immediately released after it is depressed, with the film near the beginning of its projection cycle, after the time delay produced by the multivibrator 349, the multivibrator 350 will be triggered to supply a pulse to the AND gate 342. With the apparatus in its rewind state, the contact D$b$ will be closed, and the gate 342 will be enabled over the circuit completed over the back contact $e$ of the relay RK and the contact D$b$.

The REPLAY pulse will thus be produced, causing the switch S6 to be closed again through the gate 340, and driving the apparatus towards its O state. With the REPLAY signal present, the relay RK will be energized, and will remain energized over its own front contact $a$ and the contact O$b$, closed until the apparatus reaches the OFF position. The solenoids SL1 and SL2 will be energized, preventing the cassette from being ejected as it moves into the OFF position, and preventing the locator pin from being withdrawn as described above.

The apparatus will then continue to move from its O position to its P position again. As the apparatus moves through the O position, the relay RK will be released as before.

Because the control system for the capstan drive motor DCM2 will operate to form the loop 282 within a second of the entry of the sound array into the cassette, the relay PRK will pick up soon enough so that the operator can begin to record substantially as soon as he sees pictures on the screen 5. For this purpose, it is convenient to move the record button RPB to the RECORD position as soon as the pushbutton IPB is released. Thus, a sound track can be recorded substantially at the beginning of the picture sequence and continued to the end of the sequence.

When the button RPB is returned to its LISTEN position, the operator can produce the sound picture recorded. By use of the pushbutton IPB, this recorded sound sequence can be reviewed and edited if desired, by returning the film to a desired starting point ahead of the point at which editing is desired. The recorded program can be interrupted at any time after the relay PRK has been picked up in the PROJECT cycle, so that if it is desired to change the recorded signal from a given point on, that can readily be done.

While the invention has been described with respect to the specific details of a particular embodiment thereof, many changes and variations will occur to those skilled in the art upon reading the foregoing description. Such can obviously be made without departing from the scope of the invention.

Having thus described the invention, what is claimed is:

1. A sound motion picture production system, comprising a housing, a viewing screen mounted in said housing, a loudspeaker, means forming a receptacle adapted to receive a film cassette in said housing, means forming a projection aperture in said housing communicating with said receptacle, means forming a sound aperture in said housing communicating with said receptacle, a capstan, an acoustic transducer, incremental drive means insertable into said receptacle for engagement with the film in a cassette in said receptacle and operable to advance the film incrementally past said projection aperture, optical means operable when said incremental drive means is engaged with film and effective when operated to project images through the film onto said screen, means actuated when said incremental drive means is inserted into said receptacle for inserting said capstan and said transducer into said aperture for engagement with the film in a cassette in said receptacle, a servomechanism responsive to the average length of a film in said receptacle between said apertures for driving said capstan at a speed tending to keep said average length constant, amplifying means connected to said loudspeaker, and delay means actuated when said capstan is inserted for connecting said transducer to said amplifier after an interval sufficient to allow said servomechanism to form a constant average length of film between said apertures.

2. In apparatus for processing and producing sound motion pictures in response to the insertion of a cassette containing a strip of motion picture film bearing a sound track, the combination comprising, incremental drive means for moving the film incrementally past a projection station, a sound transducer adapted to engage the sound track, capstan means for advancing the film continuously past the sound transducer, a servomechanism for driving said capstan means at a speed determined by the length of the film between said capstan and said incremental drive means to form and maintain a loop of film of constant average size, sound reproducing means, and switching means operative after a delay sufficient to permit the formation of said loop to connect said transducer to said sound reproducing means.

3. In apparatus for processing and producing sound motion pictures for use with a strip of motion picture film bearing a sound track, the combination comprising, incremental drive means for moving the film incrementally past a projection station, a sound transducer adapted to engage the sound track, capstan means for advancing the film continuously past the sound transducer, a servomechanism for driving said capstan means at a speed determined by the length of the film between said capstan and said incremental drive means to form and maintain a loop of film of constant average size, sound reproducing means, and switching means operative after a delay sufficient to permit the formation of said loop to connect said transducer to said sound reproducing means.

4. In apparatus for processing and producing sound motion pictures with the aid of a cassette containing a strip of at least partially exposed motion picture film bearing latent photographic images and a sound track, the combination comprising, incremental drive means for moving the film incrementally past a projection station, a sound transducer adapted to engage the sound track, capstan means for advancing the film continuously past the sound transducer, a servomechanism for driving said capstan means at a speed determined by the length of the film between said capstan and said incremental drive means to form and maintain a motion isolating loop of film between said transducer and said incremental drive means, sound reproducing means, and switching means operative after a delay sufficient to permit the formation of said loop to connect said transducer to said sound reproducing means.

5. Apparatus for sound cinematography, comprising a housing, means forming a receptacle adapted to receive a film cassette in said housing, incremental film drive means, a capstan, a sound transducer, means mounting said incremental film drive means, said capstan and said transducer for movement between first positions in said receptacle and second positions outside of said receptacle, actuating means selectively operable to move said incremental drive means, said capstan and said transducer simultaneously to their first and to their second positions, and a servomechanism effective when said capstan is in its first position for driving said capstan at a speed determined by the length of the film between said capstan and said incremental drive means to form and maintain a loop of film of constant average size.

6. The apparatus of claim 5, in which said servomechanism comprises a radiation sensor, a source of radiation energizable to irradiate said sensor over a path adapted to be interrupted by said loop, and means responsive to said sensor for controlling the speed of said capstan, and further comprising means controlled by said actuating means for energizing said radiation source when said capstan is in its first position.

7. Sound motion picture apparatus for use with a film cassette including a strip of film bearing a sound track and mounted for movement between two terminal positions over a path in which the film engages first and second rollers, said apparatus comprising a support adapted to receive the cassette and to hold it in a predetermined position, slip clutch means operable to engage the film in a cassette received by said support, reversible drive means selectively operable to drive said slip clutch means to tend to move the film in a first direction toward its first terminal position and in a second direction toward its second terminal position, incremental drive means engageable with the film in a cassette received by said support at a first location between the rollers and operable when so engaged to move the film in increments towards its first terminal position, snubber stop means synchronized with said incremental drive means for engaging the first roller in a cassette received by said support to hold it against rotation when said incremental drive means is engaged, capstan means synchronized with said snubber stop means for engaging the film in a cassette received by said support with the second roller when said snubber stop means is engaged, sound transducer means synchronized with said snubber stop means for engaging the film in a cassette received by said support at a location on the other side of said second roller from said first location when said snubber stop means is engaged, motor means responsive to the amplitude of an applied signal for driving said capstan means at a speed determined by said amplitude, means responsive to the reception of a cassette by said support for applying a signal to said motor means with an amplitude effective to drive the film when engaged by said capstan means at a speed greater than the average speed of the film produced by said incremental drive means to produce a loop of film between the rollers when said capstan means is engaged, and means responsive to the average length of the loop so produced for adjusting the amplitude of the signal applied to said motor means to adjust the average length of the loop to a predetermined value.

8. The apparatus of claim 7, further comprising sound producing means, switching means operable to connect said transducer to said sound producing means, and means effective when said synchronized means have been engaged for time sufficient to allow the formation of a film loop of said predetermined length for operating said switching means to connect said transducer to said sound producing means while said synchronized means remain engaged.

9. Apparatus for manipulating a film cassette containing a strip of motion picture film bearing a sound track, a film gate for the exposure and projection of successive increments of film passing through said gate, and processing means effective when enabled to process said film as it is moved through said gate; said apparatus comprising sensing means responsive to engagement with the cassette for producing a signal indicating whether or not the film has been processed, actuating means controlled by said sensing means for transporting said film to cause it to be processed when it has not been processed, projection means controlled by said sensing means for projecting images of the portion of the film in the film gate while incrementally transporting the film through the gate when it has been processed, a sound transducer, a capstan, motor means for driving said capstan, means responsive to engagement with a cassette for operating said motor means, means mounting said transducer, said capstan and said motor means between first positions, in which said capstan and said transducer are adapted to engage the film and second positions in which said capstan and said transducer are disengaged from film in a cassette engaged by said sensing means, means controlled by said actuating means for moving said capstan, said transducer and said motor means to said first positions when said projection means is operated, a servomechanism for driving said motor means at a speed determined by the length of the film between said capstan and said projection means to form and maintain a loop of film of constant average size, said servomechanism comprising a signal generator including a radiation sensor and a source of radiation energizable to illuminate said sensor over a path interrupted by said loop when the loop is above said average size, and means controlled by said actuating means for energizing said source of radiation when said projection means is operated.

* * * * *